US012649993B2

(12) United States Patent
Sugawara et al.

(10) Patent No.: US 12,649,993 B2
(45) Date of Patent: Jun. 9, 2026

(54) TRAINING DATA GENERATION DEVICE, TRAINIG DATA GENERATION METHOD, AND MEDIUM

(71) Applicant: NEC Corporation, Tokyo (JP)

(72) Inventors: Chisato Sugawara, Tokyo (JP); Gaku Nakano, Tokyo (JP); Nana Jumonji, Tokyo (JP); Yosuke Kimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 351 days.

(21) Appl. No.: 18/273,193

(22) PCT Filed: Feb. 4, 2021

(86) PCT No.: PCT/JP2021/004081
§ 371 (c)(1),
(2) Date: Jul. 19, 2023

(87) PCT Pub. No.: WO2022/168223
PCT Pub. Date: Aug. 11, 2022

(65) Prior Publication Data
US 2024/0084528 A1    Mar. 14, 2024

(51) Int. Cl.
*E01C 23/01*    (2006.01)
*G06T 7/00*    (2017.01)
*G06V 10/774*    (2022.01)

(52) U.S. Cl.
CPC ............ *E01C 23/01* (2013.01); *G06T 7/0004* (2013.01); *G06V 10/774* (2022.01); *G06T 2207/20081* (2013.01); *G06T 2207/20084* (2013.01)

(58) Field of Classification Search
None
See application file for complete search history.

(56) References Cited

U.S. PATENT DOCUMENTS

2022/0406042 A1* 12/2022 Yonetani .............. G06N 3/0475

FOREIGN PATENT DOCUMENTS

| | | |
|---|---|---|
| JP | 2010-539740 A | 12/2010 |
| JP | 2018-163554 A | 10/2018 |
| JP | 2019-196680 A | 11/2019 |
| JP | 2020-144572 A | 9/2020 |
| JP | 2020-147961 A | 9/2020 |
| WO | 2018/105122 A1 | 6/2018 |

OTHER PUBLICATIONS

International Search Report for PCT Application No. PCT/JP2021/004081, mailed on Apr. 27, 2021.
English translation of Written opinion for PCT Application No. PCT/JP2021/004081, mailed on Apr. 27, 2021.

* cited by examiner

*Primary Examiner* — Leon Flores
(74) *Attorney, Agent, or Firm* — Sughrue Mion, PLLC

(57) ABSTRACT
A training data generation device according to the present invention includes: a memory; and at least one processor coupled to the memory. The processor performs operations. The operations including: selecting, from items included in any of a state of a road, a type of the road, a type of sensor information for determining the state of the road, an acquisition condition of the sensor information and an external environment in an acquisition of the sensor information, a combination including at least two or more of the items; and extracting the sensor information using the combination as training data to be used for training a model for determining the state of the road using the sensor information.

18 Claims, 12 Drawing Sheets

DETERIORATION
DEGREE IS SMALL

DETERIORATION
DEGREE IS LARGE

Fig. 4

ROAD

| DETERIORATION DEGREE | ARROW |
|---|---|
| SMALL | ⇧ |
| LARGE | ⬆ |

Fig. 8

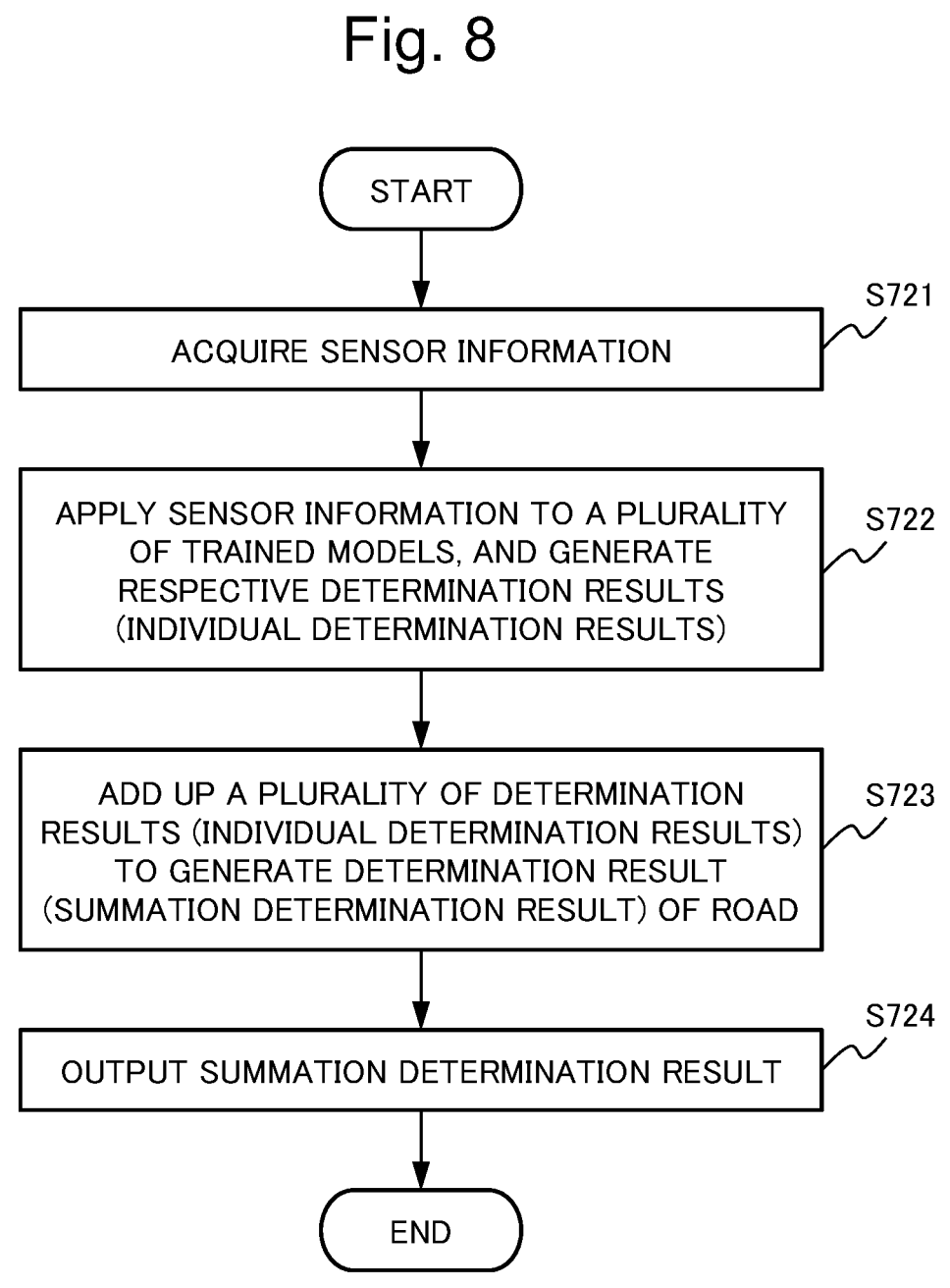

START

↓

ACQUIRE SENSOR INFORMATION ⟿ S721

↓

APPLY SENSOR INFORMATION TO A PLURALITY OF TRAINED MODELS, AND GENERATE RESPECTIVE DETERMINATION RESULTS (INDIVIDUAL DETERMINATION RESULTS) ⟿ S722

↓

ADD UP A PLURALITY OF DETERMINATION RESULTS (INDIVIDUAL DETERMINATION RESULTS) TO GENERATE DETERMINATION RESULT (SUMMATION DETERMINATION RESULT) OF ROAD ⟿ S723

↓

OUTPUT SUMMATION DETERMINATION RESULT ⟿ S724

↓

END

SENSOR INFORMATION

TRAINING DATA GENERATION DEVICE, TRAINIG DATA GENERATION METHOD, AND MEDIUM

This application is a National Stage Entry of PCT/JP2021/004081 filed on Feb. 4, 2021, the contents of all of which are incorporated herein by G8110reference, in their entirety.

TECHNICAL FIELD

The present invention relates to determination of a state of a structure such as a road, and particularly relates to determination using a model.

BACKGROUND ART

Management of roads in local governments and management of runways and the like in airports require a lot of labor and cost.

Therefore, as management of a structure such as a road and a runway, a technique of determining a state of the structure based on an image of the structure has been proposed (see PTLs 1 and 2).

A runway monitoring system (hereinafter referred to as a "runway monitoring system") described in PTL 1 captures an image of a runway using a camera. Then, the runway monitoring system detects foreign object debris (FOD) on the runway based on an adaptive image process of the captured image. In this process, the runway monitoring system corrects the captured image. Further, the runway monitoring system determines whether it is daytime or nighttime, detects an abnormal light state from an image captured at night, and ignores the image in which the abnormal light state is detected. With these operations, the runway monitoring system improves the detection of FOD using images captured under ambient light during daytime and nighttime, in particular images captured during nighttime, without the use of auxiliary lighting, such as laser lighting.

The runway monitoring system discloses a runway surface model as a model.

A road maintenance management system (hereinafter, referred to as a "road maintenance management system") described in PTL 2 prepares in advance a training model trained with images obtained by imaging a road for each pavement type as training data. In this way, in order to make a determination by using the model, a model trained by using predetermined training data (referred to as a "training model" in the road maintenance management system) is required in advance.

Then, the road maintenance management system determines the pavement type of the road image by using the training model. Then, the road maintenance management system detects a deterioration range of the pavement from the road image in which the pavement type is determined, and calculates a state of deterioration of the pavement in the deterioration range. Then, the road maintenance management system determines and classifies the deterioration degree of the pavement for each pavement type.

The road maintenance management system determines deterioration for each type of pavement in an image of a road using the above operation.

CITATION LIST

Patent Literature

PTL 1: JP 2010-539740 A
PTL 2: JP 2020-147961 A

SUMMARY OF INVENTION

Technical Problem

An image of a road or the like is captured outdoor and captured in various times and environments. Therefore, the captured image is an image captured in a situation in which the state of the road or the like, the imaging condition, the environment, and the like are different.

As described above, in a case where images captured in different situations are determined using one determination model, it is difficult to ensure accuracy of the determination. Therefore, it is desirable to use a plurality of models for determining the road.

For example, the road maintenance management system makes determination using a plurality of models related to the type of pavement.

The runway monitoring system discloses determining the images at daytime and nighttime, but does not disclose the handling of the model.

In order to generate a plurality of models, a plurality of pieces of training data is necessary.

However, in general, many man-hours are required to generate training data. Specifically, when a plurality of pieces of training data is generated, many man-hours are required.

Therefore, it is desired to reduce the load of generating training data.

However, PTLs 1 and 2 do not disclose description is related to the load of generating training data.

As described above, PTLs 1 and 2 have an issue that the load of generating training data cannot be reduced.

In order to solve the above issues, an object of the present invention is to provide a training data generation device or the like that reduces a load of generating training data used for training a model used for determining a state of a road or the like.

Solution to Problem

A training data generation device according to an aspect of the present invention includes: a memory; and at least one processor coupled to the memory. The processor performs operations. The operations include: selecting, from items included in any of a state of a road, a type of the road, a type of sensor information for determining the state of the road, an acquisition condition of the sensor information and an external environment in an acquisition of the sensor information, a combination including at least two or more of the items; and extracting, using the combination, the sensor information as training data to be used for training a model for determining the state of the road.

A state determination device according to an aspect of the present invention includes: the training data generation device described above; a model generation device that executes machine learning for a predetermined model using a plurality of pieces of the training data and generates a plurality of trained models related to the plurality of respective pieces of training data; and sensor information determination device that applies the sensor information to the plurality of trained models, acquires a plurality of determination results of the plurality of trained models, and determines the state of the road related to the sensor information using the plurality of acquired determination results.

A state determination system according to an aspect of the present invention includes: the state determination device described above; a sensor information acquisition device that outputs the sensor information to the state determination device; and a display device that displays information output by the state determination device.

A training data generation method according to an aspect of the present invention includes: selecting, from items included in any of a state of a road, a type of the road, a type of sensor information for determining the state of the road, an acquisition condition of the sensor information and an external environment in an acquisition of the sensor information, a combination including at least two or more of the items; and extracting, using the combination, the sensor information as training data to be used for training a model for determining the state of the road.

A state determination method according to an aspect of the present invention includes: by a training data generation device, performing the training data generation method described above; by a model generation device, executing machine learning for a predetermined model using a plurality of pieces of the training data and generating a plurality of trained models related to the plurality of respective pieces of training data; and by a sensor information determination device, applying the sensor information to the plurality of trained models, acquiring a plurality of determination results of the plurality of trained models, and determining the state of the road related to the sensor information using the plurality of acquired determination results.

A state determination method according to an aspect of the present invention includes: by a state determination device, performing the state determination method described above; by a sensor information acquisition device, outputting the sensor information to the state determination device; and by a display device, displaying information output by the state determination device.

A non-transitory computer-readable recording medium according to an embodiment of the present invention embodies a program for causing a computer to perform a method. The method includes: selecting, from items included in any of a state of a road, a type of the road, a type of sensor information for determining the state of the road, an acquisition condition of the sensor information and an external environment in an acquisition of the sensor information, a combination including at least two or more of the items; and extracting, using the combination, the sensor information as training data to be used for training a model for determining the state of the road.

A non-transitory computer-readable recording medium according to an embodiment of the present invention embodies a program for causing a computer to perform a method. The method includes: performing the above steps, executing machine learning for a predetermined model using a plurality of the training data and generating a plurality of trained models related to the plurality of respective pieces of training data; and applying the sensor information to the plurality of trained models, acquiring a plurality of determination results of the plurality of trained models, and determining the state of the road related to the sensor information using the plurality of acquired determination results.

Advantageous Effects of Invention

The example advantage according to the present invention is to reduce the load of generating training data used for training a model used for determining a state of a road or the like.

BRIEF DESCRIPTION OF DRAWINGS

FIG. 4 is a diagram illustrating an example of display of a plurality of states.

FIG. 8 is a flowchart illustrating an example of an operation of determining a state of a road by a sensor information determination device.

EXAMPLE EMBODIMENT

Figure 1:
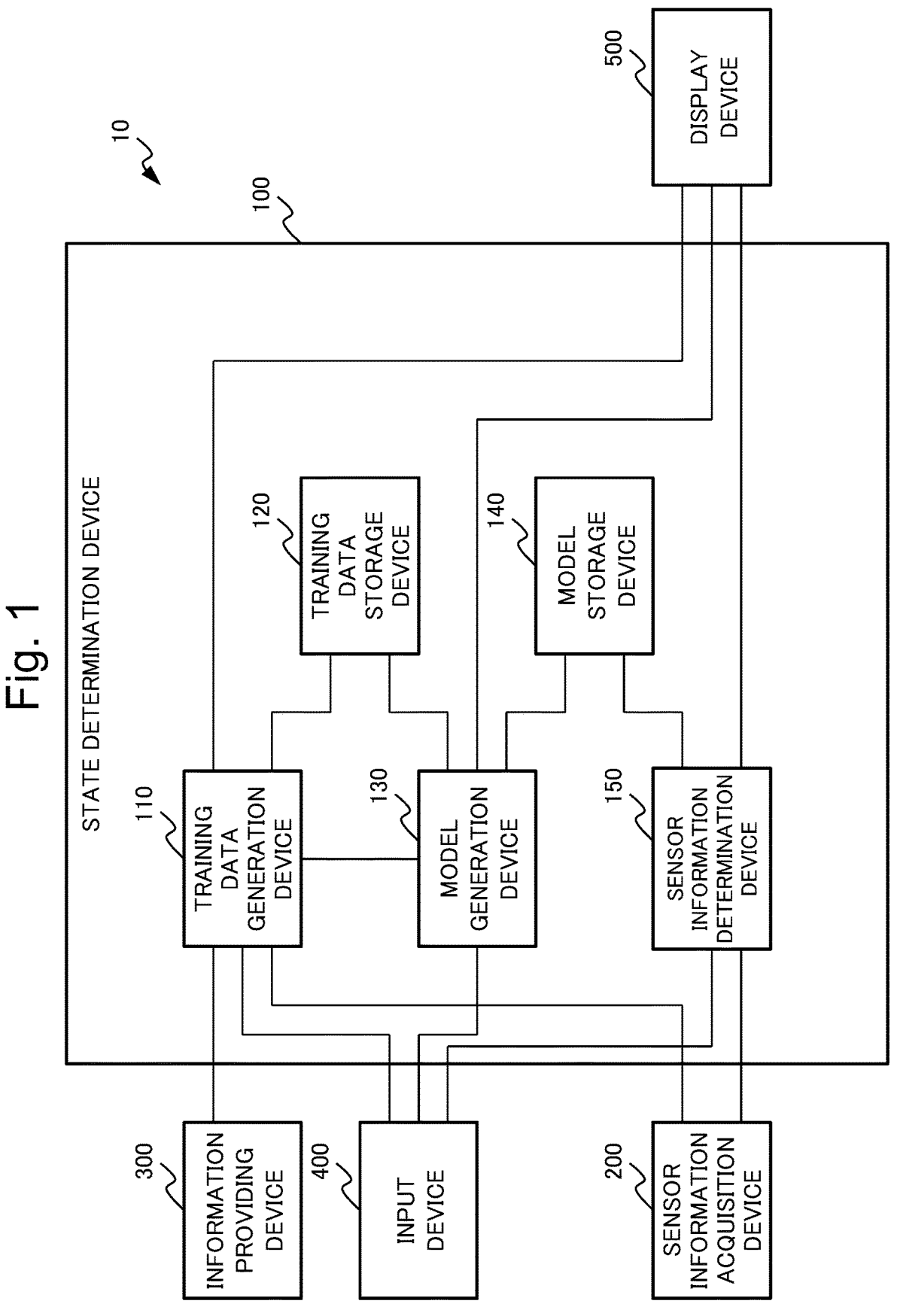
FIG. 1 is a block diagram illustrating an example of a configuration of a state determination system according to a first example embodiment.

Next, an example embodiment of the present invention will be described with reference to the drawings.

Each drawing is for describing each example embodiment. However, each example embodiment is not limited to the description of the drawings. Similar configurations in the respective drawings are denoted by the same reference numerals, and repeated description thereof may be omitted.

In the drawings used in the following description, in the description of each example embodiment, the description of portions not related to the solution of the issue of the present invention may be omitted and not illustrated.

First, terms used in the description of each example embodiment will be described.

The "road" is a structure on which at least one of a vehicle and a person travels. However, the road is not limited to a road installed on the ground as long as at least one of a vehicle and a person can travel on the road. For example, the road may be a bridge, a platform, or the like. Further, the road is not limited to a road on which vehicles and persons travel, and may be a passage through which other objects travel. For example, the road may be a runway, a taxiway, and an apron on which an airplane travels.

Furthermore, the road is not limited to a place on which a vehicle or the like travels, and may include a structure (for example, a sign, a white line, a guardrail, a reflecting mirror, a traffic light, an indicator light, a lighting fixture, or a street tree) related to the road.

Further, each example embodiment is not limited to the road, and may determine the state of the structure that can be determined using the acquired sensor information. For example, when the sensor information is an image of a road, each example embodiment may determine the state of a structure (for example, a utility pole or a building (house, apartment, building, wall, fence, and the like)) provided in the vicinity of the road included in the image.

However, in the following description, for convenience of description, description will be made using a "road".

The "type of road" is a category of a road to be determined.

An example of the type of road is a category (municipal roads, prefectural roads, national roads, expressways, and the like) related to a manager of the road. Alternatively, the type of road may be a category (for example, a main road and a bypass road of a road, a main road and a community road, or a runway, a taxiway, and an apron at an airport) according to the purpose of use.

The determination of the category of the road can be made using at least one of road category information acquired from an organization that manages the road, a map production company, or the like, and a speed limit.

Alternatively, the number of lanes on a road affects a traveling state (for example, speed and movement) of a vehicle traveling on the road. Therefore, the number of lanes of a road (including a case where there is no lane) is an example of the type of road.

As a method of detecting the number of lanes of a road, for example, there is a method of detecting it by applying predetermined image processing to an image obtained by capturing a road.

The "state of the road" is a state of the road to be determined, a state of the road affecting the determination, and a material of the road (in particular, a road surface).

The state of the road is to be determined using the trained model. The training data generated in each example embodiment is training data used to generate a trained model that determines the state of the road.

Examples of the state of the road to be determined include a deterioration type (cracks (vertical, horizontal, or tortoiseshell), ruts, pot holes, and the like) of a road surface of the road, deterioration of a seal of the road surface, and fraying of a peripheral portion of the seal.

However, the state of the road to be determined is not limited to the deterioration of the road surface. For example, the state of the road to be determined may be deterioration (for example, blurring of a white line of a road surface and a road surface sign, or breakage of a sign) of a structure related to the road.

The state of the road to be determined is not limited to deterioration of the road and structures related to the road. For example, a white line and a road surface sign attached to a road surface are constructed in such a way as to be reflected at night. Therefore, the state of the road to be determined may be the state of reflection of the white line and the road surface sign.

Alternatively, the state of the road to be determined may be the lighting state of the illumination installed on the road, the luminance of the illumination, or the illuminance of the road surface.

Alternatively, the state of the road to be determined may be determination of a result of pavement construction or repair construction (for example, determination of work quality).

The manhole has a different appearance in the image between a sunny day and a rainy day. Alternatively, the degree of wetting of the road surface in rain or sprinkling changes the color of the road surface and changes the state of the captured image. Thus, the dry and wet conditions of the road surface affect the captured image. Furthermore, the size of the puddle covering the road surface affects the range of the road included in the image. As described above, the dry and wet conditions of the road surface, and the presence or absence and size of the puddle are examples of road conditions that affect the determination.

The dry and wet conditions of the road surface and the puddle can be determined using weather information or predetermined image processing (for example, a luminance determination model of a road surface or a puddle detection model).

The road surface treatment (for example, a straight groove for drainage or a non-slip circular groove on a slope) affects the image. Therefore, the road surface treatment is an example of the state of the road that affects the determination.

The road surface treatment can be determined using a predetermined image process on the image of the road surface.

The material of the road surface is the material of the pavement of the road and the shape of the material of the pavement.

The material of the pavement of the road is asphalt, concrete, stone, brick, gravel, or the like. The material of the road pavement may include additives added to the main material, such as a porous asphalt mixture used for drainage pavement and the like.

The shape of the material of the pavement is the roughness and shape of the grains used for the pavement, the color of the grains, and the like.

The type of pavement of the road and the material of the road surface can be determined by applying predetermined image processing or a model (for example, a model for each pavement described in PTL 2) to the image of the road surface.

The "sensor information" is information acquired using a predetermined sensor in order to determine the state of the road. In each example embodiment, information related to a road acquired using a predetermined sensor (for example, an accelerometer or camera) included in a sensor information acquisition device (for example, a drive recorder) mounted on a moving object (for example, a vehicle, a two-wheeled vehicle, a drone, or a person) is used as the sensor information. For example, the sensor information is an acceleration detected by an accelerometer of a drive recorder mounted on a vehicle traveling on a road whose state is to be determined, or an image captured by a camera of the drive recorder.

However, the sensor information acquisition device is not limited to a device mounted on a moving object. For example, the sensor information acquisition device may be a device fixed to a predetermined structure such as a fixed point camera.

The sensor information is not limited to one piece of information and may include a plurality of pieces of information as information used for determining the state of the road. For example, the sensor information may be information including an image and acceleration.

Furthermore, the sensor information may include other information in addition to the information used for determination.

For example, the sensor information may include information (hereinafter, also simply referred to as an "external environment") of an external environment related to acquisition of the sensor information, such as a photographing time and a photographing place.

Alternatively, the sensor information may include acquisition conditions of the sensor information such as an exposure time and illuminance in photographing.

Alternatively, the sensor information may include information related to the type of the sensor information such as image quality, size, aspect ratio, image resolution, and frame rate of the image.

Alternatively, the sensor information may include information used for management of the sensor information, such as an identifier of an image.

The "moving object" moves with a sensor information acquisition device (for example, a drive recorder or an imaging device) including a sensor that acquires sensor information mounted.

The moving object is any moving object. For example, the moving object may be a vehicle (four-wheeled vehicle or two-wheeled vehicle) in which a drive recorder is installed, or a drone. Alternatively, the moving object may be a person who holds and moves the imaging device.

The "acquisition condition of sensor information" is a condition related to acquisition of sensor information (for example, the state or characteristic of the moving object).

For example, in a case where the sensor information acquisition device is mounted on a vehicle, the mounting position, the angle, and the direction with respect to the traveling direction of the sensor information acquisition device may be different when the type (vehicle type) of the vehicle is different. Therefore, the type of vehicle in which the sensor information acquisition device is mounted is an example of the acquisition condition of the sensor information.

Even when the vehicle types are different, the mounting positions of the sensor information acquisition devices may be substantially the same. In this case, the position and area of the road in the image are substantially the same. Therefore, images having the same road position and area may be treated as the same type of images in generation of training data.

Therefore, the acquisition condition of the sensor information may be at least one of the position and the area of the road (road surface) in the image or at least one of the position and the area of a region that is not the road in the image.

Alternatively, the two-wheeled vehicle has a large change in inclination of the vehicle body as compared with the four-wheeled vehicle. Therefore, the number of wheels of the moving object is an example of the acquisition condition of the sensor information.

Alternatively, when the moving object is moving at a high speed, there is a case where an object in a captured image is unclear (for example, occurrence of motion blur). In the determination using such an image, the accuracy of determination decreases. That is, the speed of the moving object affects the state of the image used for determination. As described above, the moving speed of the moving object is an example of the acquisition condition of the sensor information.

The motion blur is also affected by an exposure time in capturing an image and illuminance of an imaging place.

Therefore, the exposure time and the illuminance are examples of acquisition conditions of the sensor information.

Alternatively, the acceleration and the vibration of the moving object at the time of imaging affect the captured image. Therefore, the acceleration and the vibration of the moving object are examples of the acquisition condition of the sensor information.

As described above, the state of the moving object in which the sensor information acquisition device is mounted is an example of the acquisition condition of the sensor information.

The "external environment" is information obtained by excluding the state of the road, the type of the road, the type of the sensor information, and the state of the acquisition condition of the sensor information from the information affecting the determination using the sensor information.

For example, the imaging condition (for example, a time zone of image capturing (morning, daytime, evening, night, and the like) and weather (sunny, cloudy, rainy, rainy, snowy, etc.)) affects determination using an image. Therefore, the imaging condition (for example, an imaging time zone and weather) is an example of the external environment.

When acquiring the sensor information, the sensor information acquisition device may give an external environment such as imaging conditions (for example, time) to the sensor information.

Alternatively, the surrounding sound at the time of imaging increases when the road is congested. The congestion of the road affects the progress of deterioration of the road.

Alternatively, when the road surface is deteriorated, vibration of a moving object such as a vehicle associated with movement increases. Therefore, when the road surface is deteriorated, in a moving object such as a vehicle, a sound (hereinafter, referred to as "vibration sound") generated with vibration during movement is large.

Alternatively, the rainfall amount affects the captured image. The rain sound during rain is proportional to the amount of rain to some extent.

As described above, the sound is one piece of information effective for determining the state of the road. Therefore, the sound (for example, ambient sound, vibration sound, and rain sound) is an example of the external environment. In a case where a sound is used as the external environment, the sensor information acquisition device may add a sound detected by the microphone when the sensor acquires the sensor information to the sensor information using a microphone mounted on the moving object.

When the moving object is a vehicle, a traffic volume and a congestion state of a road on which the vehicle travels affect traveling (for example, a passable lane and a speed) of the vehicle. When the moving object is a person, the congestion state of the road (for example, a sidewalk) affects the movement of the person. As described above, the traffic volume and the congestion affect the acquired sensor information. That is, the traffic volume, congestion, and the like around the moving object are examples of the external environment.

The congestion or the like can be determined by applying predetermined image processing on the acquired image. Alternatively, the congestion information can be acquired from a predetermined traffic information providing organization.

Alternatively, a shadow of each of a structure (for example, a signboard) and a tree installed around or near a road may appear in the image of the road surface. Such a shadow affects determination using an image. Therefore, structures (for example, advertising signboards, signs, utility poles, and mid- to high-rise buildings (buildings and bridges) installed beside roads) installed around or near a road and trees (natural tees or street trees) around the road are examples of the external environment.

Structures and trees around roads and the like can be obtained by applying predetermined image processing on a captured image or from map information or the like.

The sensor information is affected by the state of the road, the type of the road, the type of the sensor information, the acquisition condition of the sensor information, and the external environment. That is, the state of the road, the type of the road, the type of the sensor information, the acquisition condition of the sensor information, and the external environment are each related to the acquired sensor information. Therefore, in the following description, these items may be collectively referred to as "items related to sensor information".

First Example Embodiment

Next, a first example embodiment will be described with reference to the drawings.

Description of Configuration

First, a configuration of a training data generation device 110 and the like according to the first example embodiment will be described with reference to the drawings.

FIG. 1 is a block diagram illustrating an example of a configuration of a state determination system 10 according to the first example embodiment.

The state determination system 10 includes a state determination device 100, a sensor information acquisition device 200, an information providing device 300, an input device 400, and a display device 500.

The devices included in the state determination system 10 are connected via a predetermined communication path (for example, the Internet). Each device may not be directly connected.

For example, the sensor information acquisition device 200 may store the acquired sensor information in a predetermined removable storage device (for example, Universal Serial Bus (USB) memory). Then, the user may output the sensor information stored in a removable storage device (for example, a USB memory) to the state determination device 100 using a reading device connected to the state determination device 100.

Alternatively, the sensor information acquisition device 200 may store the sensor information in a storage device (not illustrated). In this case, the state determination device 100 may acquire the sensor information from the storage device.

The number of devices included in the state determination system 10 is not limited to that in FIG. 1. For example, the state determination system 10 may include a plurality of sensor information acquisition devices 200.

The sensor information acquisition device 200 is mounted on a moving object (not illustrated), and acquires sensor information used for determination of a road as the moving object moves. The sensor information acquisition device 200 is any sensor information acquisition device. For example, the sensor information acquisition device 200 may be a drive recorder mounted on a vehicle. In this case, the sensor information acquisition device 200 outputs at least one of an image and acceleration as the sensor information.

Furthermore, the sensor information acquisition device 200 may include the type of the sensor information in the sensor information. For example, in a case where the sensor information is an image, the sensor information acquisition device 200 may include, in the sensor information, information related to the type of the sensor information such as image quality, size, aspect ratio, resolution, and frame rate of the image.

Furthermore, the sensor information acquisition device 200 may include an acquisition condition of the sensor information in the sensor information. For example, in a case where the sensor information acquisition device 200 is a drive recorder, the sensor information acquisition device 200 may include at least one of the speed and the acceleration of the vehicle detected by the drive recorder in the sensor information.

Furthermore, the sensor information acquisition device 200 may include data of at least part of the external environment in the sensor information. For example, in a case where the sensor information acquisition device 200 is a drive recorder, the sensor information acquisition device 200 may include the time and the position at which the sensor information is acquired in the sensor information.

Then, the sensor information acquisition device 200 outputs the acquired sensor information to the state determination device 100.

The information providing device 300 outputs at least part of the external environment to the state determination device 100. The information providing device 300 is any information providing device. For example, the information providing device 300 is a device (for example, a server that provides weather information) or a data center of a company that provides predetermined information.

The state determination device 100 may acquire the external environment from the information providing device 300 using information including the sensor information. For example, in a case where the sensor information includes the date and time and the position at which the sensor information has been acquired, the state determination device 100 may acquire weather data at the time of acquisition of the sensor information from a predetermined weather information providing destination using the date and time and the position.

How the state determination device 100 acquires the external environment may be appropriately determined by a user or the like.

The input device 400 outputs information related to selection of training data in the state determination device 100, which will be described later, to the state determination device 100. The input device 400 is any input device. For example, the input device 400 may be an input device of a system used by a road administrator.

The display device 500 displays information (for example, the state of the road) output by the state determination device 100. The display device 500 is any display device. For example, the display device 500 may be a display device of a system used by a road administrator.

The input device 400 and the display device 500 may be one device (for example, a touch panel of a terminal device carried by a user).

The state determination device 100 acquires sensor information from the sensor information acquisition device 200. The state determination device 100 may acquire the external environment from at least one of the information providing device 300 and the sensor information acquisition device 200. In this case, the state determination device 100 adds the acquired external environment to the sensor information.

Then, the state determination device 100 generates training data to be used for generation of a trained model used for determination of a road by using the acquired sensor information. In this operation, the state determination device 100 may use an external environment.

Then, the state determination device 100 generates a trained model used for determination of a road by using the generated training data.

Then, the state determination device 100 applies newly acquired sensor information to the generated trained model to determine the state of the road.

Then, the state determination device 100 outputs the determination result to the display device 500. The state determination device 100 may output at least one of the acquired sensor information, the generated training data, the generated trained model, and information related thereto.

The state determination device 100 may be mounted on a moving object in which the sensor information acquisition device 200 is mounted.

Figure 2:
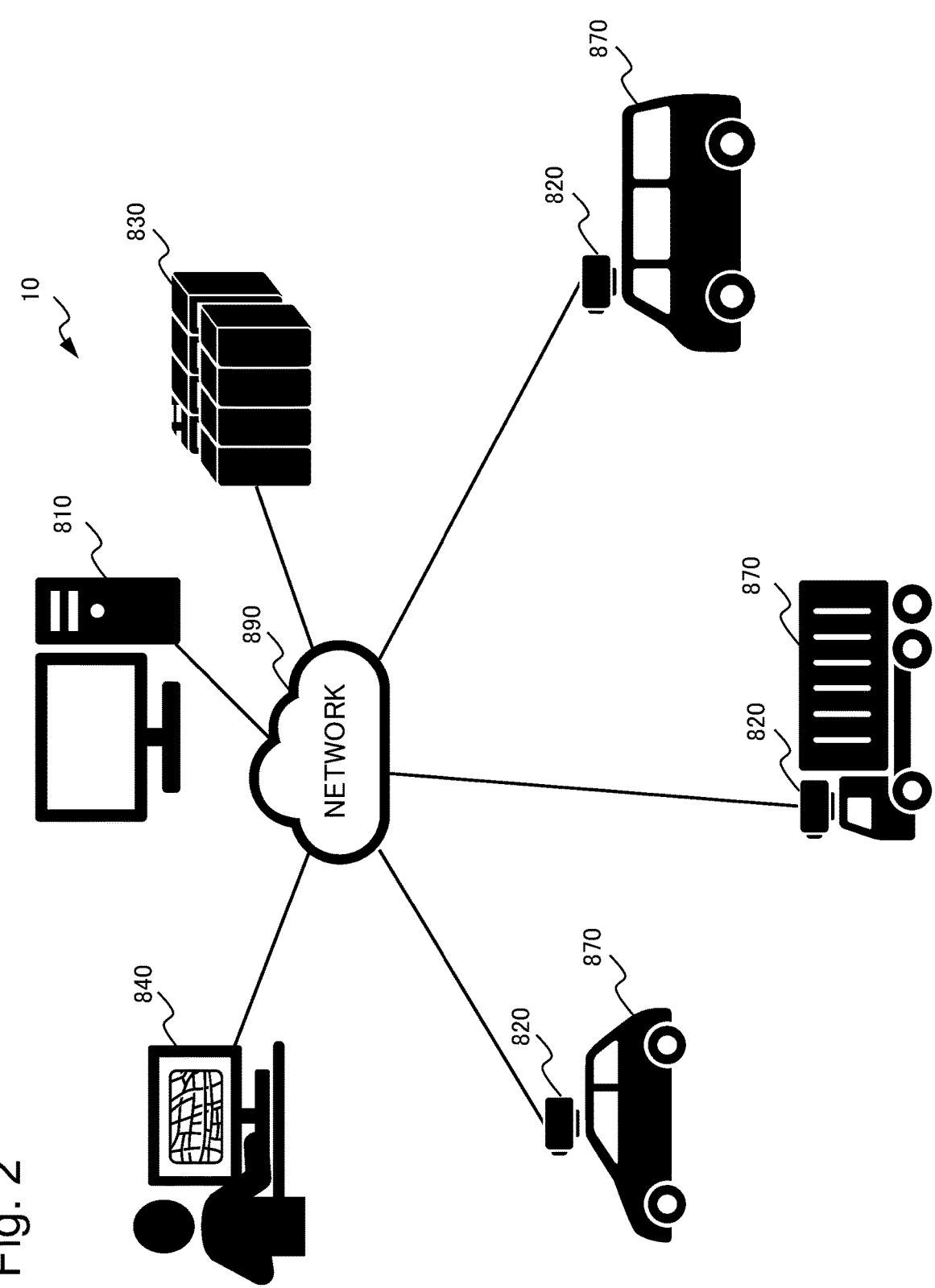
FIG. 2 is a diagram illustrating an example of a specific configuration of the state determination system.

FIG. 2 is a diagram illustrating an example of a specific configuration of the state determination system 10.

In FIG. 2, the state determination system 10 includes a server 810 as the state determination device 100, a drive recorder 820 as the sensor information acquisition device 200, and a data center 830 as the information providing device 300. Further, the state determination system 10 includes a terminal device 840 as the input device 400 and the display device 500. Furthermore, in FIG. 2, the state determination system 10 includes a vehicle 870 as a moving object in which the drive recorder 820 is mounted and that moves. Furthermore, in FIG. 2, the state determination system 10 includes a network 890 as a communication path to which each device is connected. FIG. 2 is a diagram illustrating an example of a case where a plurality of drive recorders 820 is used.

The network 890 is a communication path that connects each device.

The vehicle 870 travels on a road with the drive recorder 820 mounted.

The drive recorder 820 captures an image of the road to output the image to the server 810.

The drive recorder 820 is mounted inside (inside) the vehicle 870. However, FIG. 2 illustrates the drive recorder 820 adjacent to the outside of the vehicle 870 for easy understanding.

The data center 830 outputs the external environment to the server 810.

The server 810 acquires the sensor information from the drive recorder 820. If necessary, the server 810 adds the external environment acquired from data center 830 to the sensor information. Then, the server 810 generates training data to be used for generation of a trained model used for determination of a road state by using the acquired sensor information. Then, the server 810 generates a trained model using the generated training data. Then, the server 810 applies the sensor information newly acquired from the drive recorder 820 to the trained model to determine a road condition. Then, the server 810 outputs the determination result to the terminal device 840.

The terminal device 840 displays the determination result acquired from the server 810.

The server 810 may output at least one of the acquired sensor information, the generated training data, the generated trained model, and information related thereto to the terminal device 840. Alternatively, the server 810 may acquire at least one of information related to generation of training data and information related to generation of a trained model from the terminal device 840.

The server 810, the drive recorder 820, the data center 830, the terminal device 840, the vehicle 870, and the network 890 is not particularly limited. They may be generally selling products. Therefore, a detailed description thereof will be omitted.

The description returns to the description with reference to FIG. 1.

A method of displaying the state of the road on the display device 500 is any method. The user may appropriately determine how to display the state of the road on the display device 500.

Figure 3:
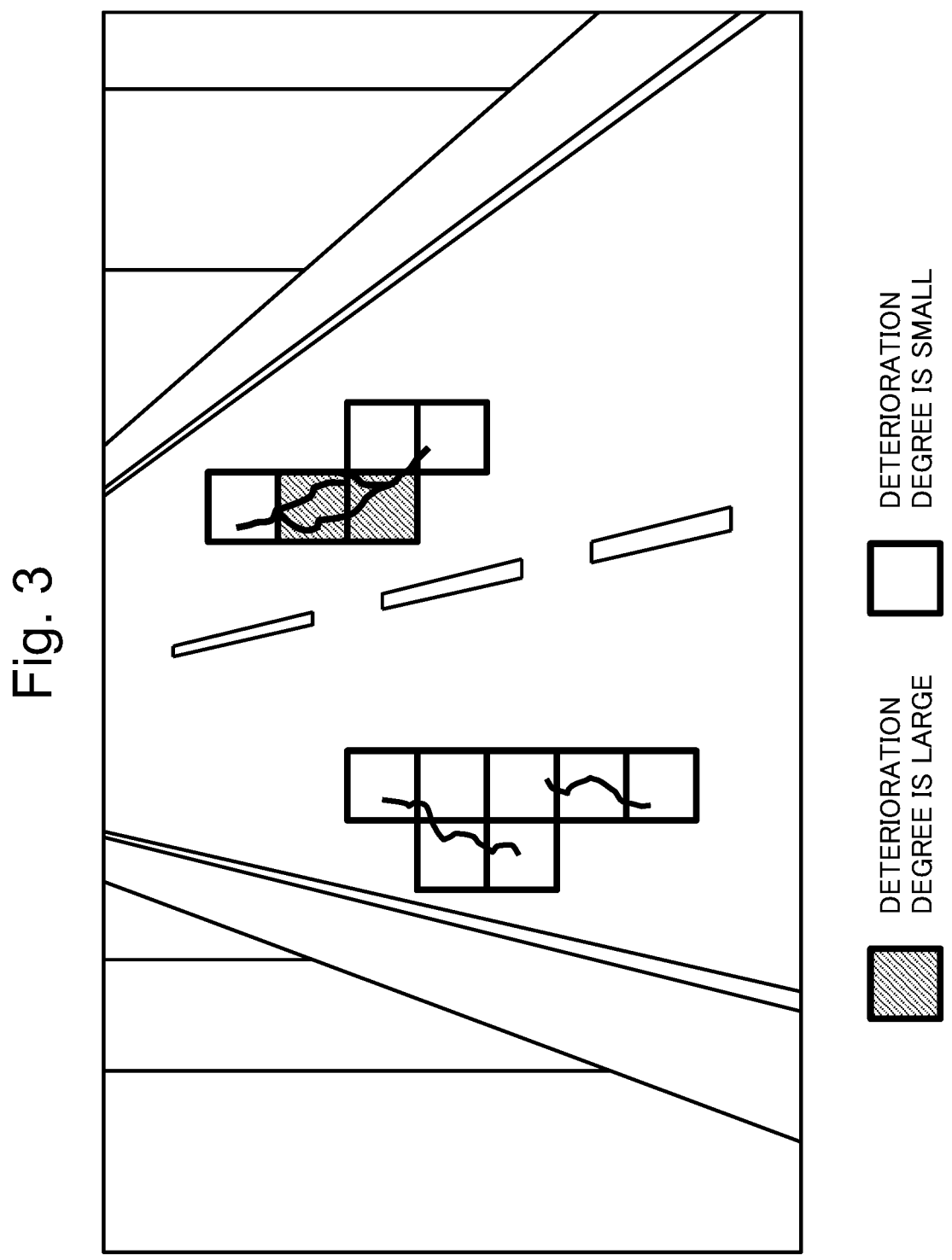
FIG. 3 is a diagram illustrating an example of display.

FIG. 3 is a diagram illustrating an example of display.

FIG. 3 is an example of display in which the sensor information is an image of a road, and the state of the road to be determined is deterioration. In FIG. 3, the display device 500 indicates the deterioration position using a rectangular frame in the image of the road to be determined. Further, in FIG. 3, the display device 500 highlights (hatched) the position determined as "deterioration degree is large".

The display device 500 may collectively display states of a plurality of roads (not of one road) as the display of the state of the road determined by the state determination device 100.

Figure 4:
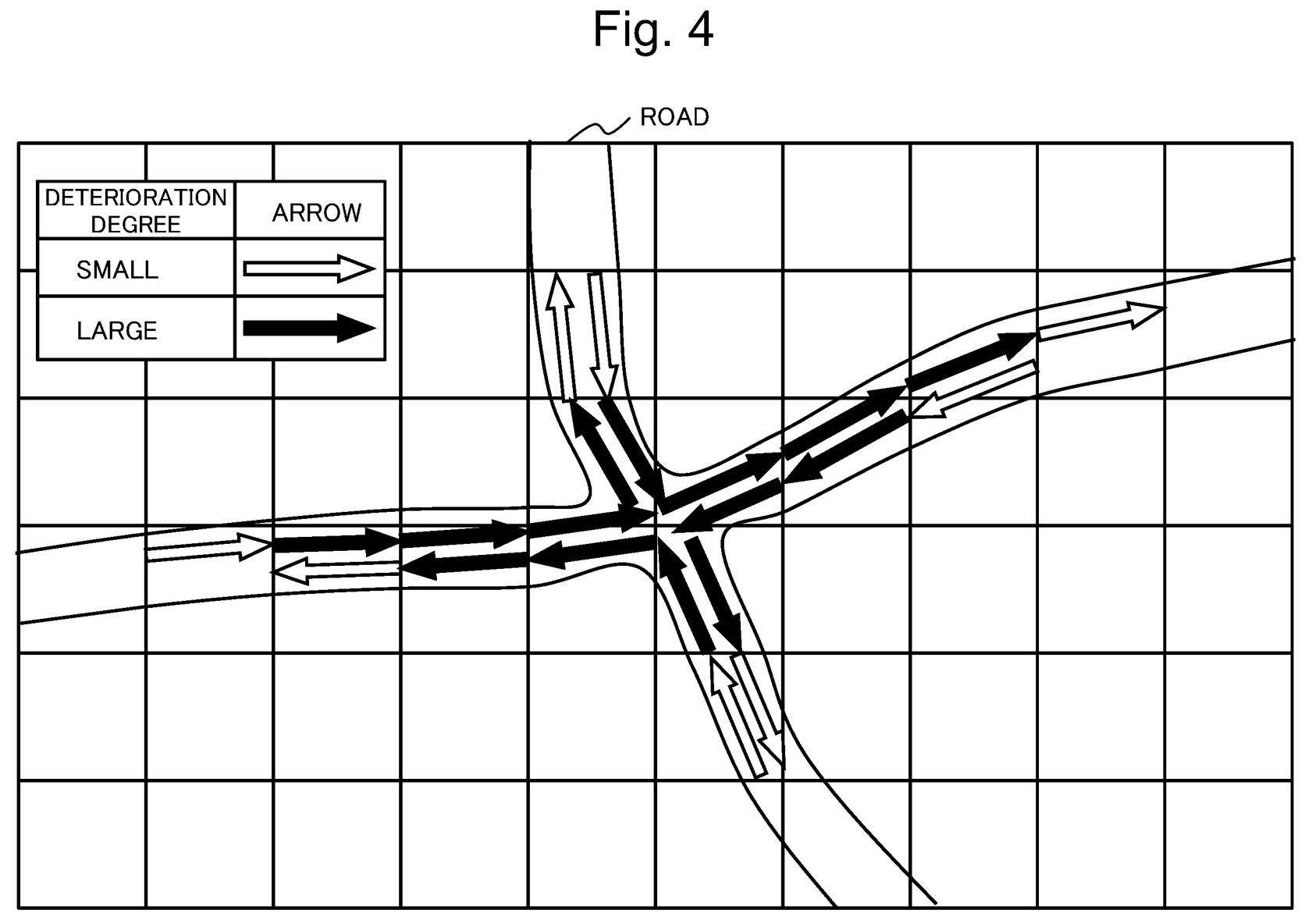

FIG. 4 is a diagram illustrating an example of display of a plurality of states.

In FIG. 4, the display device 500 indicates a portion determined to be deteriorated on a road in a predetermined region using an arrow. Furthermore, in FIG. 4, the display device 500 highlights (black arrow) a portion determined as "deterioration degree is large". The direction of the arrow in FIG. 4 is the traveling direction of the vehicle on the road.

The description returns to the description with reference to FIG. 1.

Next, a configuration of the state determination device 100 will be described.

The state determination device 100 includes the training data generation device 110, a training data storage device 120, a model generation device 130, a model storage device 140, and a sensor information determination device 150.

The training data generation device 110 generates the training data using the sensor information. The training data generation device 110 will be described in detail later.

The training data storage device 120 stores the training data generated by the training data generation device 110.

The model generation device 130 executes machine learning for a model (hereinafter, referred to as a "pre-trained model") that is not trained using the training data using the training data stored in the training data storage device 120, and generates a trained model.

An acquisition source of the pre-trained model used for machine learning by the model generation device 130 is any acquisition source. For example, the user may store the pre-trained model in the model storage device 140 in advance. Alternatively, the model generation device 130 may acquire the pre-trained model from a device (not illustrated) in generating the trained model.

The model generation device 130 may generate a plurality of trained models. For example, when the training data storage device 120 stores a plurality of pieces of training data, the model generation device 130 may generate a trained model related to each of all or some pieces of training data.

In this case, the model generation device 130 may generate a trained model related to each of the plurality of pieces of training data using one pre-trained model. In this case, the model generation device 130 generates the trained models whose number is the same as the number of training data.

However, the model generation device 130 may use a plurality of pre-trained models.

For example, the model generation device 130 may generate a trained model using a pre-trained model related to each training data. In this case, the model generation device 130 generates the trained models whose number is the same as the number of training data.

However, the model generation device 130 may generate trained models whose number is larger than that of the training data.

For example, in the case of using a plurality of pre-trained models, the model generation device 130 may apply the plurality of pieces of training data to at least some of the pre-trained models to generate a plurality of trained models related to at least some of the pre-trained models.

Alternatively, the model generation device 130 may apply at least some training data to a plurality of different pre-trained models to generate a plurality of trained models related to the at least some training data.

Then, the model generation device 130 stores the generated trained model in the model storage device 140.

The model generation device 130 may calculate the accuracy of the trained model by applying the data for accuracy determination to the generated trained model, and output the calculated accuracy to a predetermined device (for example, the display device 500). Then, the model generation device 130 may retrain the trained model based on a predetermined instruction. In this case, the state determination device 100 may generate training data for retraining using the training data generation device 110. In the generation of the training data for retraining, the training data generation device 110 may acquire information (for example, an instruction of an item whose accuracy is desired to be improved) related to the generation of the training data for retraining from the user or the like.

The above operation will be described using an example.

For example, it is assumed that accuracy of a trained model (hereinafter, referred to as a "shadow road state determination model") for determining a road state in an image with many shadows is low.

The model generation device 130 outputs the accuracy of the shadow road state determination model to the display device 500. The user refers to the display on the display device 500, and instructs the state determination device 100 to retrain the solar shadow road state determination model using the input device 400. At this time, the user may transmit sensor information for retraining (for example, an image with many shadows) to the state determination device 100.

When acquiring the retraining instruction from the input device 400, the model generation device 130 requests the training data generation device 110 to generate the training data for retraining based on the instruction. The training data generation device 110 generates training data for retraining. Then, the model generation device 130 retrains the shadow road state determination model using the training data for retraining.

The model generation device 130 may calculate the accuracy of the retrained shadow road state determination model and re-output the accuracy of the retrained shadow road state determination model. The user may refer to the re-output accuracy and repeat the retraining instruction until predetermined accuracy is obtained.

In generating the trained model, the model generation device 130 may select at least one of a training method and a model type using related information about a road to be determined.

The model storage device 140 stores the generated trained model. The model storage device 140 may store the pre-trained model.

The sensor information determination device 150 determines the state of the road by applying the sensor information acquired from the sensor information acquisition device 200 to the trained model stored in the model storage device 140.

In a case where a plurality of trained models is stored, the sensor information determination device 150 applies the sensor information to each of the plurality of trained models and acquires a determination result (hereinafter referred to as an "individual determination result") of each of the plurality of trained models.

Then, the sensor information determination device 150 generates a road state (hereinafter referred to as a "summation determination result") related to the sensor information by using the plurality of acquired determination results (individual determination results). For example, the sensor information determination device 150 may add up the determination results (individual determination results) of the plurality of respective trained models using the weight for each trained model to generate a determination result (summation determination result) of determining a road.

Then, the sensor information determination device 150 outputs a result of the summation determination (summation determination result) to a predetermined device (for example, the display device 500).

The sensor information determination device 150 may acquire an instruction (for example, the weight of the model in summation) related to the summation from the user or the like.

Next, a configuration of the training data generation device 110 will be described.

Figure 5:
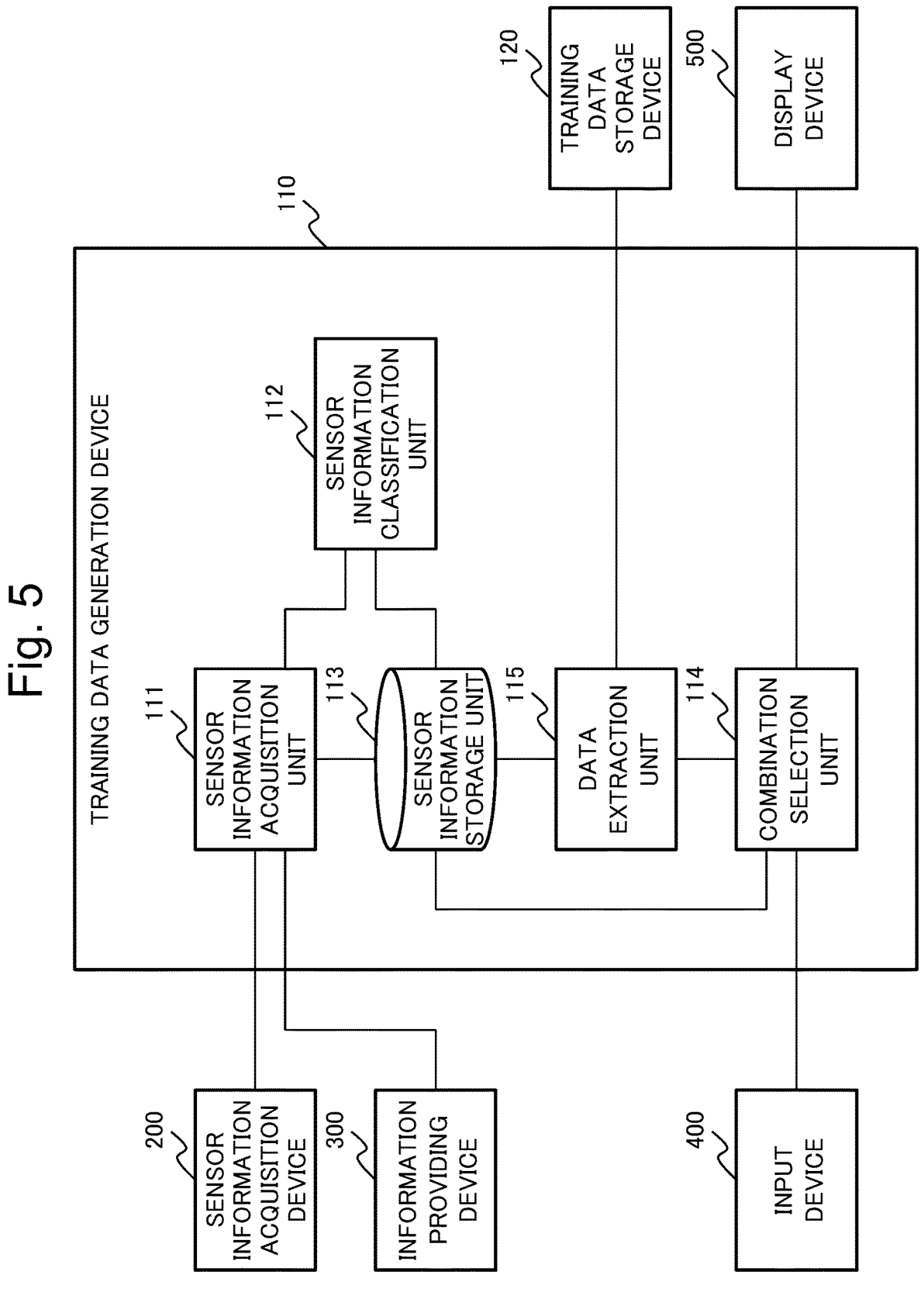
FIG. 5 is a block diagram illustrating an example of a configuration of a training data generation device according to the first example embodiment.

FIG. 5 is a block diagram illustrating an example of a configuration of the training data generation device 110 according to the first example embodiment.

The training data generation device 110 includes a sensor information acquisition unit 111, a sensor information classification unit 112, a sensor information storage unit 113, a combination selection unit 114, and a data extraction unit 115.

The sensor information acquisition unit 111 acquires sensor information from the sensor information acquisition device 200. Furthermore, the sensor information acquisition unit 111 may acquire an external environment from at least one of the sensor information acquisition device 200 and the information providing device 300, and include the acquired external environment in the sensor information.

Then, the sensor information acquisition unit 111 stores the acquired sensor information in the sensor information storage unit 113. The stored sensor information is used for generation of training data to be described later.

The sensor information acquisition unit 111 may include information other than the above in the sensor information.

For example, the sensor information acquisition unit 111 may acquire data (for example, the deterioration position and its score in each image) indicating a correct answer in each piece of sensor information from a device not illustrated and add the data to the sensor information. Hereinafter, data indicating a correct answer is referred to as a "correct answer label". Alternatively, the sensor information acquisition unit 111 may acquire sensor information including a correct answer label from the sensor information acquisition device 200.

The sensor information storage unit 113 stores the sensor information.

The sensor information stored in the sensor information storage unit 113 is data to be extracted by the data extraction unit 115 as described later.

Therefore, the training data generation device 110 may include the sensor information classification unit 112 that classifies the sensor information in order to facilitate extraction of the sensor information in the data extraction unit 115.

The sensor information classification unit 112 classifies the sensor information stored in the sensor information storage unit 113 in such a way that the data extraction unit 115 can easily extract the sensor information. For example, the sensor information classification unit 112 classifies the sensor information related to each item. Alternatively, the sensor information classification unit 112 may classify the sensor information in accordance with a combination of predetermined items in addition to the classification related to each item or instead of the classification related to each item.

The sensor information acquisition unit 111 may output the sensor information to the sensor information classification unit 112 without storing the sensor information in the sensor information storage unit 113. In this case, the sensor information classification unit 112 classifies the sensor information acquired from the sensor information acquisition unit 111, and stores the classified sensor information in the sensor information storage unit 113.

The sensor information classification unit 112 may classify at least part of the sensor information into a plurality of items. For example, in a case where the sensor information is an image captured in daytime when the weather is good, the sensor information classification unit 112 may classify the image into both an item of good weather and an item of daytime.

The combination selection unit 114 selects, from items related to the following sensor information, a combination including at least two or more of the items.

(1) road state,
 (2) type of road,
 (3) type of sensor information for determining a road state,
 (4) acquisition condition of sensor information, and
 (5) external environment in acquisition of sensor information.

For example, the combination selection unit 114 selects a combination of a predetermined imaging time (acquisition time or acquisition time zone of the sensor information) as an item of the acquisition condition of the sensor information and a structure (for example, a high-rise building) installed around the road as an item of the external environment.

The combination selection unit 114 may select a plurality of combinations. In this case, the number of items included in each combination may be different. For example, the combination selection unit 114 may select a combination including two items and a combination including three items.

The combination of the items selected by the combination selection unit 114 is any combination. The combination selection unit 114 may use a combination of items set in advance.

Alternatively, the combination selection unit 114 may select a combination of all combinable items. For example, the combination selection unit 114 may select a combination of all items related to the stored sensor information.

Alternatively, the combination selection unit 114 may select a combination related to a preset rule. For example, the combination selection unit 114 may select a combination of a predetermined item (for example, the acquisition time of the sensor information) and another item.

For example, in the case of a road in an urban area, a shadow of at least one of a building around the road and a street tree appears in the image. Alternatively, in the case of a suburban road, shadows of trees in forests around the road appear in the image. However, the position of the appearing shadow changes according to the captured time. Furthermore, there may be a time zone in which no shadow appears.

The shape of the shadow appearing in the image is related to a building and a tree around the road.

It is assumed that the sensor information acquisition device 200 is a drive recorder mounted in a vehicle used for managing a road, and the sensor information is an image of the road. In general, a vehicle used for managing a road travels on a road to be managed many times at a certain frequency. However, the travel time (that is, the image capturing time) is not constant and often changes.

Therefore, in this case, images having different shadow positions are collected as the sensor information.

Therefore, the combination selection unit 114 may use a "time zone" and a "structure or tree around the road" as items used for the combination. For example, the combination selection unit 114 may use any one of "6:00 to 10:00", "10:00 to 14:00", and "14:00 to 18:00" related to sunlight time as the item of the "acquisition time". Furthermore, the combination selection unit 114 may use any one of a "high-rise building", a "medium-rise building", a "low-rise building", a "street tree", and a "forest" as a "structure or tree around the road". For example, the combination selection unit 114 may select a combination of "6:00 to 10:00" and the "high-rise building", a combination of "10:00 to 14:00" and the "high-rise building", and a combination of "14:00 to 18:00" and the "high-rise building" as the combination of high-rise buildings in the sunlight time.

As described above, in a case where the sensor information is repeatedly acquired for the same road, the combination selection unit 114 may select a combination including items (for example, the above acquisition time) that change in a plurality of pieces of sensor information related to the same road.

Alternatively, the combination selection unit 114 may select a combination of the speed of the moving object (for example, the speed of the vehicle) and the category of the road (for example, a main road and a community road, or a municipal road, a prefectural road, a national road, and an expressway).

In this case, the combination selection unit 114 can select a combination of selecting images in which the positions of the shadows are substantially the same from the images in which the positions of the shadows are different using the acquisition time.

Furthermore, the combination selection unit 114 may select a combination including three or more of the items. For example, the combination selection unit 114 may select a combination of an acquisition time, a structure near a road, and a deterioration type.

In selecting a combination of items, the combination selection unit 114 may acquire an instruction of an item to be selected from a predetermined device (for example, the input device 400). For example, the combination selection unit 114 may select a combination based on an instruction from a user acquired from a predetermined device (for example, the input device 400). In this case, the combination selection unit 114 may output items selectable as the combination to a predetermined device (for example, the display device 500).

For example, the combination selection unit 114 may extract items related to the sensor information stored in the sensor information storage unit 113, and output the extracted items as "items selectable as the combination".

Alternatively, the combination selection unit 114 may store a list of items in advance, and output the item that is not able to be extracted from the sensor information in the list as "the item unselectable as the combination".

As will be described later, the combination selected by the combination selection unit 114 is used for extracting training data. The training data requires a certain amount of data. Therefore, the combination selection unit 114 may regard an item smaller than a predetermined number (predetermined threshold value) as "item unselectable as the combination". In this case, the combination selection unit 114 may output a reason (for example, there is no sensor information or the number of pieces of sensor information is less than a threshold value) why the item is unselectable as the combination.

Further, the combination selection unit 114 may include information related to the extraction of the sensor information in the combination to be output to the data extraction unit 115.

For example, the combination selection unit 114 may include the number of pieces of sensor information to be extracted related to the combination in the combination to be output to the data extraction unit 115. Alternatively, the combination selection unit 114 may include a range (for example, a lower limit value and an upper limit value) of the number of pieces of sensor information to be extracted related to the combination in the combination to be output to the data extraction unit 115. Alternatively, the combination selection unit 114 may include an instruction to extract all pieces of sensor information related to the combination in the combination to be output to the data extraction unit 115.

Alternatively, the combination selection unit 114 may include how to extract the sensor information related to the combination. For example, the combination selection unit 114 may include, in the combination, an instruction to extract the information in such a way as to have a predetermined distribution with respect to predetermined items.

Furthermore, the combination selection unit 114 may generate a combination including a plurality of combinations. In this case, the combination selection unit 114 may include the number or the ratio of pieces of sensor information related to the plurality of combinations in the combination.

In order to execute appropriate machine learning, a state (for example, the ratio of respective items) of data included in training data is important.

Therefore, the combination selection unit 114 may select a combination in such a way that the number or the ratio of pieces of sensor information related to the combination of respective items in the sensor information extracted by the data extraction unit 115 is a predetermined value.

For example, it is difficult to determine deterioration such as cracking in an image including a shadow as compared with an image without a shadow. Therefore, the combination selection unit 114 may select a combination in which the number of images including shadows is large.

An example of the combination will be described using a combination including items of a predetermined time and a shadow.

For example, in a case where the ratio of the images including the shadow at the predetermined time is four times the ratio of the images not including the shadow, the combination selection unit 114 generates a combination including two combinations (combinations 1 and 2) including two items (items of time and presence or absence of shadow) and the number of images as follows.

Combination 1: item 1=predetermined time, item 2=the number of images including shadow=400.

Combination 2: item 1=predetermined time, item 2=the number of images not including shadow=100.

In selection of a combination, the combination selection unit 114 may output, to a predetermined device (for example, the display device 500), at least one of the number and the ratio of pieces of sensor information related to the item that can be selected as the combination in the sensor information stored in the sensor information storage unit 113. Then, the combination selection unit 114 may acquire items to be used as a combination and an instruction of the combination to be used from a predetermined device (for example, the input device 400) and select the combination.

In this manner, the combination selection unit 114 may acquire an instruction related to the combination to be selected and select the combination.

Then, the combination selection unit 114 outputs the selected combination to the data extraction unit 115.

The combination selection unit 114 may output part of the selected combination to the data extraction unit 115. For example, the combination selection unit 114 may select a combination to be output to the data extraction unit 115 based on an instruction from the user.

An example of the operation in this case will be described.

When selecting a combination, the combination selection unit 114 outputs the selected combination to the display device 500. The user checks the combination displayed on the display device 500. Then, the user outputs an instruction of a combination to be used to the combination selection unit 114 using the input device 400. The combination selection unit 114 outputs the instructed combination to the data extraction unit 115.

In this case, the training data generation device 110 can extract training data suitable for the request from the user or the like as the training data extracted by the data extraction unit 115.

The data extraction unit 115 extracts sensor information related to the combination of items selected by the combination selection unit 114 from the sensor information stored in the sensor information storage unit 113, and stores the sensor information in the training data storage device 120. The stored sensor information is data (training data) used for machine leaning for the model by the model generation device 130.

In a case where the combination includes a plurality of combinations, the data extraction unit 115 extracts sensor information related to each combination, and collectively stores the extracted sensor information in the training data storage device 120. In a case where overlapping sensor information is extracted related to a plurality of combinations, the data extraction unit 115 may store one piece of sensor information or may store the sensor information in an overlapping manner (that is, store a plurality of pieces of the same sensor information).

In a case where the combination includes the number of pieces of sensor information, the data extraction unit 115 extracts pieces of sensor information of the number.

The data extraction unit 115 may extract a predetermined number of pieces of sensor information according to a designated rule.

For example, in a case where the sensor information is designated in such a way as to have the same ratio with respect to a plurality of time zones, the data extraction unit 115 may extract the sensor information in each designated time zone by using the number of pieces of sensor information in the time zone in which the number of pieces of sensor information is the smallest.

Alternatively, the data extraction unit 115 may randomly extract the sensor information.

Alternatively, the data extraction unit 115 may extract the sensor information in such a way that the sensor information has a predetermined distribution in at least some items (for example, a uniform distribution or a normal distribution). For example, in a case where the item is a time zone, the data extraction unit 115 may extract the sensor information in such a way as to uniformly include the sensor information in all the times from 0:00 to 23:00 (that is, the distribution is uniform in the time zone).

For example, the sensor information included in the training data is desirably less biased. It takes a lot of man-hours for the user to extract data in such a way that there is little bias in many training data. In a case where sensor information related to a combination of a plurality of items is extracted, more man-hours are required.

The training data generation device 110 can extract the sensor information along the predetermined distribution as described above. Therefore, the training data generation device 110 can generate appropriate training data. As a result, the training data generation device 110 reduces the load of generating training data on the user.

In this manner, the training data generation device 110 selects, from among the items related to the sensor information, a combination including at least two or more of the items, and generates training data to be used for training a model for determining the state of the road using the sensor information by using the selected combination. The user can reduce the load of generating training data by using the training data generation device 110.

The training data generation device 110 can also generate a plurality of pieces of training data. That is, the combination selection unit 114 can select a plurality of combinations. In this case, the training data generation device 110 reduces the load on the user or the like in generating the plurality of pieces of training data.

In a case of selecting a plurality of combinations, the combination selection unit 114 generates a combination at least some items of which are different from those of any other combination as the combination to be selected.

"Different" in this case includes a case where no item is included.

For example, in a case where the items are A, B, and C (the combinations of items are indicated by using { }), combinations including two or more of the items are combinations {A, B}, {B, C}, {C, A}, and {A, B, C}. That is, the combination selection unit 114 selects a combination to be output to the data extraction unit 115 from the combinations {A, B}, {B, C}, {C, A}, and {A, B, C}. In this case, the combination {A, B} is a combination different from the combination {A, B, C} in that the item C is not included.

When a plurality of pieces of training data is generated, at least part of the training data may include the same sensor information.

Description of Operation

Next, the operation of the device included in the state determination device 100 will be described with reference to the drawings.

First, the operation of the training data generation device 110 will be described with reference to the drawings.

Figure 6:
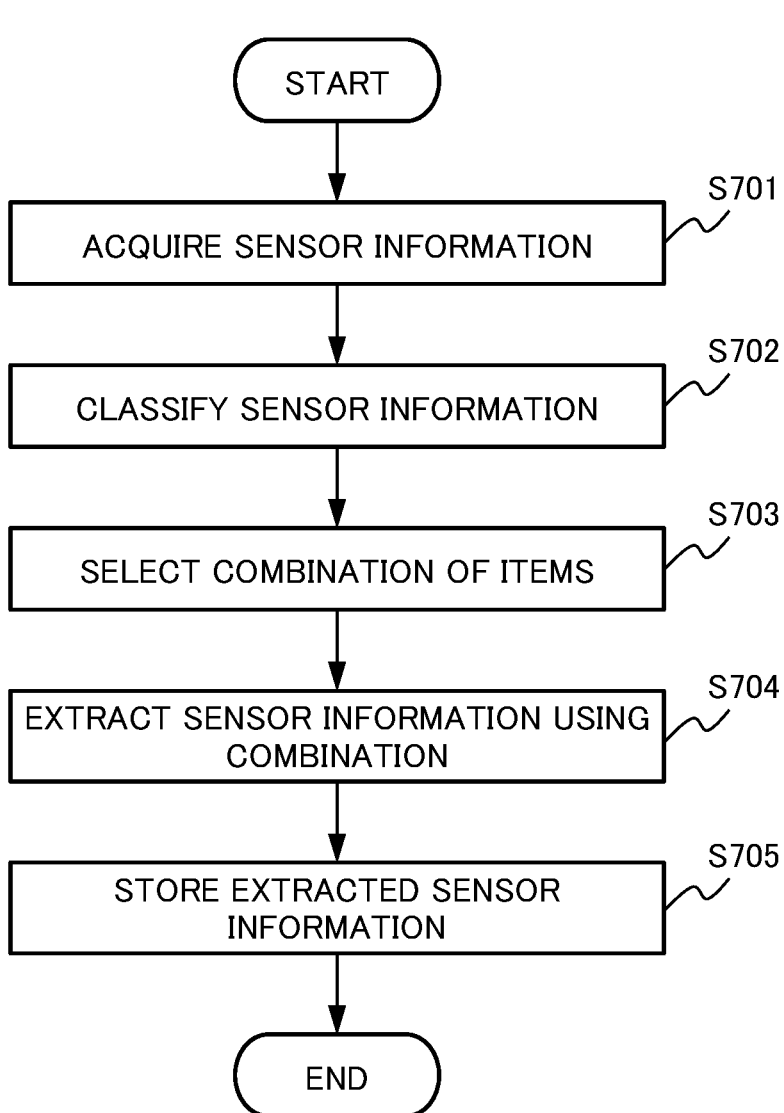
FIG. 6 is a flowchart illustrating an example of an operation of generating training data in the training data generation device.

FIG. 6 is a flowchart illustrating an example of an operation of generating training data in the training data generation device 110.

The sensor information acquisition unit 111 acquires sensor information (step S701). The sensor information acquisition unit 111 may acquire an external environment from the information providing device 300 and add the external environment to the sensor information. Then, the sensor information acquisition unit 111 stores the acquired sensor information in the sensor information storage unit 113.

The sensor information classification unit 112 classifies the sensor information stored in the sensor information storage unit 113 (step S702). The sensor information classification unit 112 may acquire, classify the sensor information from the sensor information acquisition unit 111, and then store the sensor information in the sensor information storage unit 113. However, the training data generation device 110 may not classify the sensor information.

The combination selection unit 114 selects a combination including at least two or more items (step S703). More specifically, the combination selection unit 114 selects a combination including at least two or more of the items from items related to the following sensor information.

(1) road state,
    (2) type of road,
    (3) type of sensor information for determining a road state,
    (4) acquisition condition of sensor information, and
    (5) external environment in acquisition of sensor information.

The data extraction unit 115 extracts the sensor information by using the combination (step S704). The selected sensor information is training data used for training a model for determining a state of a road using the sensor information. That is, the data extraction unit 115 extracts training data by using the combination.

The data extraction unit 115 stores the extracted sensor information (training data) in the training data storage device 120 (step S705).

The training data generation device 110 repeats the above operation until all the necessary training data is generated.

The training data generation device 110 may acquire information (for example, an instruction of items to be included in the combination) necessary for generating training data from a predetermined device (for example, the input device 400) as necessary. In this case, the training data generation device 110 may output information (for example, items that can be combined) related to acquisition of the information to a predetermined device (for example, the display device 500).

Next, an operation of the model generation device 130 will be described with reference to the drawings.

Figure 7:
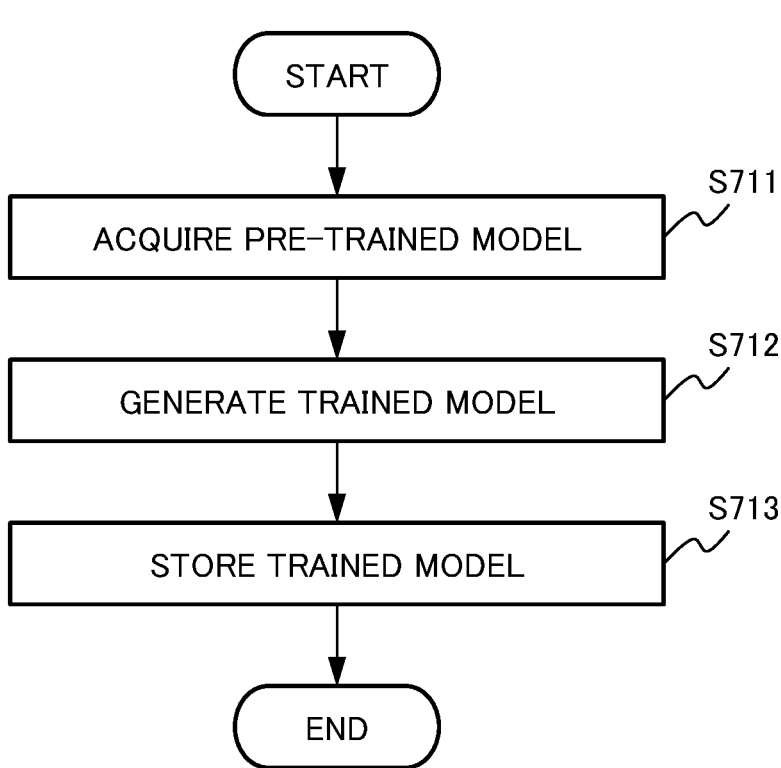
FIG. 7 is a flowchart illustrating an example of an operation of generating a trained model by a model generation device.

FIG. 7 is a flowchart illustrating an example of an operation of generating a trained model by the model generation device 130.

The model generation device 130 acquires a predetermined model (pre-trained model) from the model storage device 140 (step S711).

The model generation device 130 executes machine leaning the pre-trained model using the training data stored in the training data storage device 120 to generate the trained model (step S712).

The model generation device 130 stores the generated trained model in the model storage device 140 (step S713).

The model generation device 130 repeats the above operation until generating trained models related to all or a designated part of the training data or until generating a designated number of trained models.

Next, an operation of the sensor information determination device 150 will be described with reference to the drawings.

FIG. 8 is a flowchart illustrating an example of an operation of determining a state of a road by the sensor information determination device 150.

The sensor information determination device 150 acquires sensor information to be determined (step S721).

The sensor information determination device 150 applies the sensor information to each of the plurality of trained models and generates a determination result (individual determination result) of each trained model (step S722).

The sensor information determination device 150 adds up the determination results (individual determination results) of the plurality of trained models to generate a determination result (summation determination result) of the state of the road (step S723).

The sensor information determination device 150 outputs the summation determination result to a predetermined device (for example, the display device 500) (step S724).

Description of Effects

Next, effects of the training data generation device 110 according to the first example embodiment will be described.

The training data generation device 110 according to the first example embodiment can achieve an effect of reducing the load of generating training data used for training the model used for determining the state of the road.

The reason is as follows.

The training data generation device 110 includes the combination selection unit 114 and the data extraction unit 115. The combination selection unit 114 selects, from items to be used for selection, a combination including at least two or more of the items. The items used for selection are items included in any of the state of the road, the type of the road, the type of the sensor information for determining the state, the acquisition condition of the sensor information, and the external environment in the acquisition of the sensor information. Then, the data extraction unit 115 extracts the sensor information using the combination as training data used for training a model for determining the state of the road using the sensor information.

The training data generation device 110 selects, from items related to the sensor information, a combination of at least two or more of the items. Then, the training data generation device 110 extracts the sensor information by using the combination. The extracted sensor information is training data related to a combination of items.

As described above, since the training data generation device 110 can generate the training data related to the combination of the items, it is possible to reduce the load of generating training data on the user or the like.

The training data generation device 110 may use the acquisition time of the sensor information as an item selected for the combination.

For example, in a case where a vehicle used for managing a road travels on a road to be managed many times at different times, the acquired image has a different shadow position related to the acquisition time of the image. However, the training data generation device 110 can generate training data using images in which the positions of shadows are substantially the same using the acquisition time.

Further, the training data generation device 110 can repeatedly generate the training data. In this case, the training data generation device 110 generates a plurality of pieces of training data related to combinations of different items.

It is desirable to use a plurality of trained models for determining the road. In order to use a plurality of trained models, it is necessary to prepare a plurality of pieces of training data.

The training data generation device 110 can generate a plurality of pieces of training data by using combinations of necessary items. Therefore, the training data generation device 110 can reduce the load of generating training data in the case of using the plurality of trained models.

Further, the training data generation device 110 generates training data related to a combination of a plurality of items. The trained model generated using the training data related to the combination of the plurality of items has improved accuracy of the determination using the sensor information acquired in the state related to the combination of the items, compared with the trained model generated using the training data related to the individual item. In this manner, the training data generation device 110 generates training data capable of generating a highly accurate trained model.

Further, the training data generation device 110 may acquire an instruction (for example, items desired by the user) related to the combination from a predetermined device (for example, the input device 400) and select the combination based on the acquired instruction (instruction from the user). In this case, the training data generation device 110 can generate training data according to the desire of the user or the like.

The training data generation device 110 may select sensor information to be extracted as training data according to a preset rule. Also in this case, the training data generation device 110 can reduce the load of generating training data.

Further, the training data generation device 110 may output at least one of the item selectable as the combination and the item unselectable as the combination.

Based on such a configuration, when receiving an instruction of an item from the user, the training data generation device 110 provides information to be used as a reference when the user decides the instruction.

Therefore, the user can give an instruction of an appropriate item when giving an instruction of items to be used in the combination.

Further, the training data generation device 110 may output the reason why the item is unselectable.

The user can give an instruction of an appropriate combination of items with reference to the output reason. Alternatively, the user can perform an operation for generating appropriate training data with reference to the reason.

For example, when the reason why a certain item is unselectable is a lack of sensor information, the user may acquire sensor information related to the item and provide the sensor information to the training data generation device 110.

Further, the training data generation device 110 may output at least one of the number and the ratio of pieces of sensor information related to the item included in the combination.

The user can determine whether the generated training data is appropriate as the training data by using at least one of the number and the ratio of pieces of output sensor information.

In this manner, the training data generation device 110 can provide information effective for generating appropriate training data to the user.

The training data generation device 110 further includes the sensor information acquisition unit 111 that acquires sensor information and the sensor information storage unit 113 that stores the sensor information. With these configurations, the training data generation device 110 can acquire and store sensor information to be extracted by the data extraction unit 115.

The training data generation device 110 further includes the sensor information classification unit 112. The sensor information classification unit 112 classifies the sensor information acquired by the sensor information acquisition unit 111 or the sensor information stored in the sensor information storage unit 113 based on the item. In this case, the data extraction unit 115 extracts the sensor information from the classified sensor information. Therefore, the training data generation device 110 can reduce the load of extracting the sensor information in the data extraction unit 115.

The state determination device 100 includes the training data generation device 110, the model generation device 130, and the sensor information determination device 150. The training data generation device 110 operates as described above. The model generation device 130 executes machine leaning for predetermined models using a plurality of pieces of training data, and generates a plurality of trained models related to the respective training data. The sensor information determination device 150 applies the sensor information to a plurality of trained models and acquires determination results of the plurality of trained models. Then, the sensor information determination device 150 determines the state of the road related to the sensor information by using the plurality of acquired determination results.

The training data generation device 110 can generate training data related to respective combinations of a plurality of items. That is, the training data generation device 110 generates training data capable of generating a trained model with high accuracy for a combination of a plurality of items.

The model generation device 130 can generate a trained model related to each of the plurality of pieces of training data. That is, the model generation device 130 generates trained models suitable for respective combinations of a plurality of items.

Further, the sensor information determination device 150 applies the acquired sensor information to the plurality of trained models and adds the determination results of the plurality of trained models.

As described above, the state determination device 100 adds the determination results using the trained models suitable for respective combinations of the plurality of items as the determination of the state of the road. Therefore, the state determination device 100 can improve the accuracy of determination of the state of the road.

PTL 2 discloses that a plurality of models related to the type of pavement is used.

However, PTL 2 does not disclose items other than the type of pavement, such as an imaging condition. Furthermore, the PTL does not disclose combining items.

Therefore, even when the technique described in PTL 2 is used, there is an issue that it is difficult to cope with a situation other than the pavement type.

PTL 1 does not disclose using a plurality of models.

Meanwhile, the training data generation device 110 generates training data related to a combination of at least two or more of the items including the pavement type. Therefore, the training data generation device 110 can generate the training data for generating the trained model with high determination accuracy in each situation even using the sensor information acquired in various situations.

Furthermore, the model generation device 130 generates a plurality of trained models using the plurality of pieces of generated training data. Therefore, the model generation device 130 can generate trained models suitable for respective combinations of a plurality of items.

Furthermore, the sensor information determination device 150 determines the state of the road by applying the sensor information to the plurality of trained models generated as described above. Therefore, the sensor information determination device 150 can appropriately determine the state of the road.

As described above, the state determination device 100 can reduce the load of generating training data and appropriately determine the state of the road using the sensor information.

Furthermore, the model generation device 130 may apply predetermined data (accuracy determination data) to the plurality of generated trained models, and calculate and output the accuracy of each of the plurality of trained models.

In this case, the user may determine the handling of the trained model with reference to the output accuracy.

For example, the user provides the state determination device 100 with sensor information of an item to be training data of a trained model with low accuracy. Then, the user instructs the state determination device 100 to retrain the trained model with low accuracy. In accordance with the instruction, the state determination device 100 generates training data using the new sensor information, and retrains the trained model with low accuracy using the generated training data.

Alternatively, the user may instruct the sensor information determination device 150 to reduce the weight of the trained models with low accuracy in the summation using the input device 400.

In this manner, the state determination device 100 can perform an operation related to the accuracy of the trained model.

The state determination system 10 includes the state determination device 100, the sensor information acquisition device 200, and the display device 500. The state determination device 100 operates as described above. The sensor information acquisition device 200 outputs the sensor information to the state determination device 100. The display device 500 displays information (for example, a summation determination result) output by the state determination device 100.

The state determination system 10 can reduce the load of generating training data and provide determination of the state of the road using the sensor information by using the above configuration.

The state determination system 10 further includes the information providing device 300. The information providing device 300 outputs an external environment to the state determination device 100.

The state determination system 10 configured as described above can achieve an operation reflecting the external environment.

The state determination system 10 further includes the input device 400. The input device 400 outputs an instruction related to generation of training data to the state determination device 100.

By using such a configuration, the state determination system 10 can generate appropriate training data. Therefore, the state determination system 10 can appropriately determine the state of the road.

Hardware Configuration

Next, a hardware configuration of the state determination device 100 will be described.

Each component of the state determination device 100 may be configured by a hardware circuit.

Alternatively, in the state determination device 100, each component may be configured using a plurality of devices connected via a network. For example, the state determination device 100 may be configured using cloud computing.

Alternatively, in the state determination device 100, the plurality of components may be configured by one piece of hardware.

Alternatively, the state determination device 100 may be achieved as a computer device including a central processing unit (CPU), a read only memory (ROM), and a random access memory (RAM). In addition to the above configuration, the state determination device 100 may be achieved as a computer device including a network interface circuit (NIC).

Figure 9:
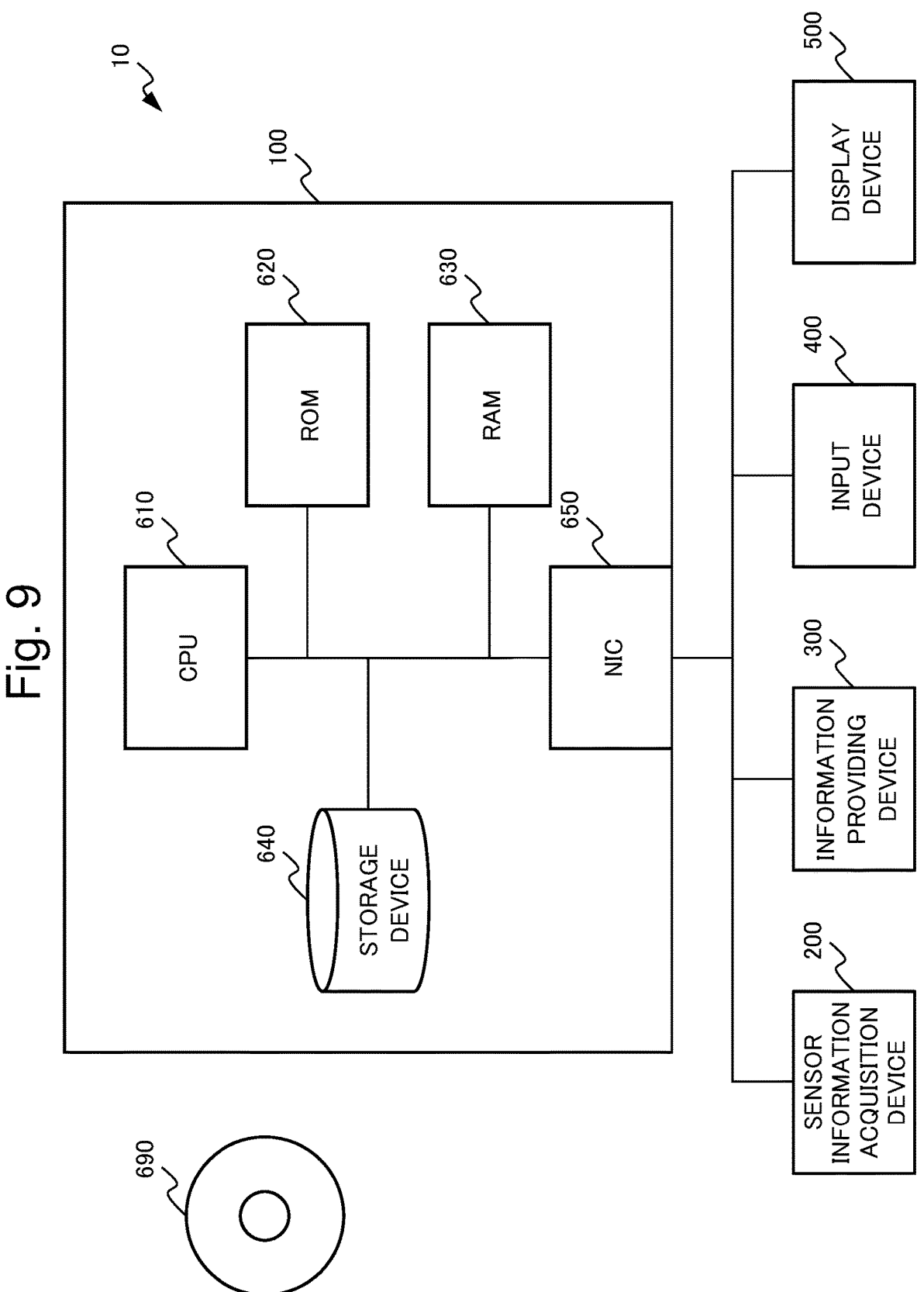
FIG. 9 is a block diagram illustrating an example of a hardware configuration of a state determination device.

FIG. 9 is a block diagram illustrating an example of a hardware configuration of the state determination device 100.

The state determination device 100 includes a CPU 610, a ROM 620, a RAM 630, a storage device 640, and an NIC 650, and thus is implemented as a computer device.

The CPU 610 reads a program from at least one of the ROM 620 and the storage device 640. Then, the CPU 610 controls the RAM 630, the storage device 640, and the NIC 650 based on the read program. Then, the computer device including the CPU 610 controls these configurations and achieves each function as each configuration illustrated in FIG. 1. Respective configurations illustrated in FIG. 1 includes the training data generation device 110, the training data storage device 120, the model generation device 130, the model storage device 140, and the sensor information determination device 150.

When implementing each function, the CPU 610 may use the RAM 630 or the storage device 640 as a temporary storage medium of programs and data.

The CPU 610 may read the program included in a recording medium 690 storing the program in a computer readable manner using a recording medium reading device (not illustrated). Alternatively, the CPU 610 may receive a program from an external device (not illustrated) via the NIC 650, store the program in the RAM 630 or the storage device 640, and operate based on the stored program.

The ROM 620 stores programs executed by the CPU 610 and fixed data. The ROM 620 is, for example, a programmable ROM (P-ROM) or a flash ROM.

The RAM 630 temporarily stores programs and data executed by the CPU 610. The RAM 630 is, for example, a dynamic-RAM (D-RAM).

The storage device 640 stores data and programs to be stored for a long period of time by the state determination device 100. The storage device 640 operates as the training data storage device 120 and the model storage device 140. The storage device 640 may operate as a temporary storage device of the CPU 610. The storage device 640 is, for example, a hard disk device, a magneto-optical disk device, a solid state drive (SSD), or a disk array device.

The ROM 620 and the storage device 640 are non-transitory recording media. On the other hand, the RAM 630 is a transitory recording medium. The CPU 610 can operate based on a program stored in the ROM 620, the storage device 640, or the RAM 630. That is, the CPU 610 can operate using a non-transitory recording medium or a transitory recording medium.

The NIC 650 relays exchange of data with an external device (the sensor information acquisition device 200, the information providing device 300, the input device 400, and the display device 500) via a network. The NIC 650 is, for example, a local area network (LAN) card. Furthermore, the NIC 650 is not limited to use wired communication, but may use wireless communication.

The state determination device 100 configured as described above can obtain an effect similar to that of the state determination device 100 in FIG. 1.

This is because the CPU 610 of the state determination device 100 in FIG. 9 can implement the function similar to that of the state determination device 100 in FIG. 1 based on the program.

The training data generation device 110, the model generation device 130, and the sensor information determination device 150 may be configured using any of the hardware described above. In this case, the state determination device 100 may be configured by connecting these devices configured by hardware via a predetermined communication path.

For example, the training data generation device 110, the model generation device 130, and the sensor information determination device 150 may be each configured using a computer device illustrated in FIG. 9. In this case, the training data storage device 120 and the model storage device 140 are configured using, for example, a predetermined storage device (for example, the storage device 640 of a computer device that achieves any of the devices).

For example, in a case where the training data generation device 110 is configured using the computer device illustrated in FIG. 9, the computer device including the CPU 610 controls the configuration illustrated in FIG. 9 to implement the function as each configuration illustrated in FIG. 5. The configuration illustrated in FIG. 5 includes the sensor information acquisition unit 111, the sensor information classification unit 112, the sensor information storage unit 113, the combination selection unit 114, and the data extraction unit 115. In this case, the storage device 640 operates as the sensor information storage unit 113.

Then, the training data generation device 110 configured as described above can obtain an effect similar to that of the training data generation device 110 in FIG. 5.

The reason is that the CPU 610 of the training data generation device 110 achieved using the computer device of FIG. 9 can implement the function similar to that of the training data generation device 110 of FIG. 5 based on the program.

Second Example Embodiment

The training data generation device 110 may use sensor information stored in a storage device (not illustrated). In this case, the training data generation device 110 may not include the sensor information acquisition unit 111, the sensor information classification unit 112, and the sensor information storage unit 113.

Alternatively, the training data generation device 110 may set a combination based on a preset combination or a preset rule.

Figure 10:
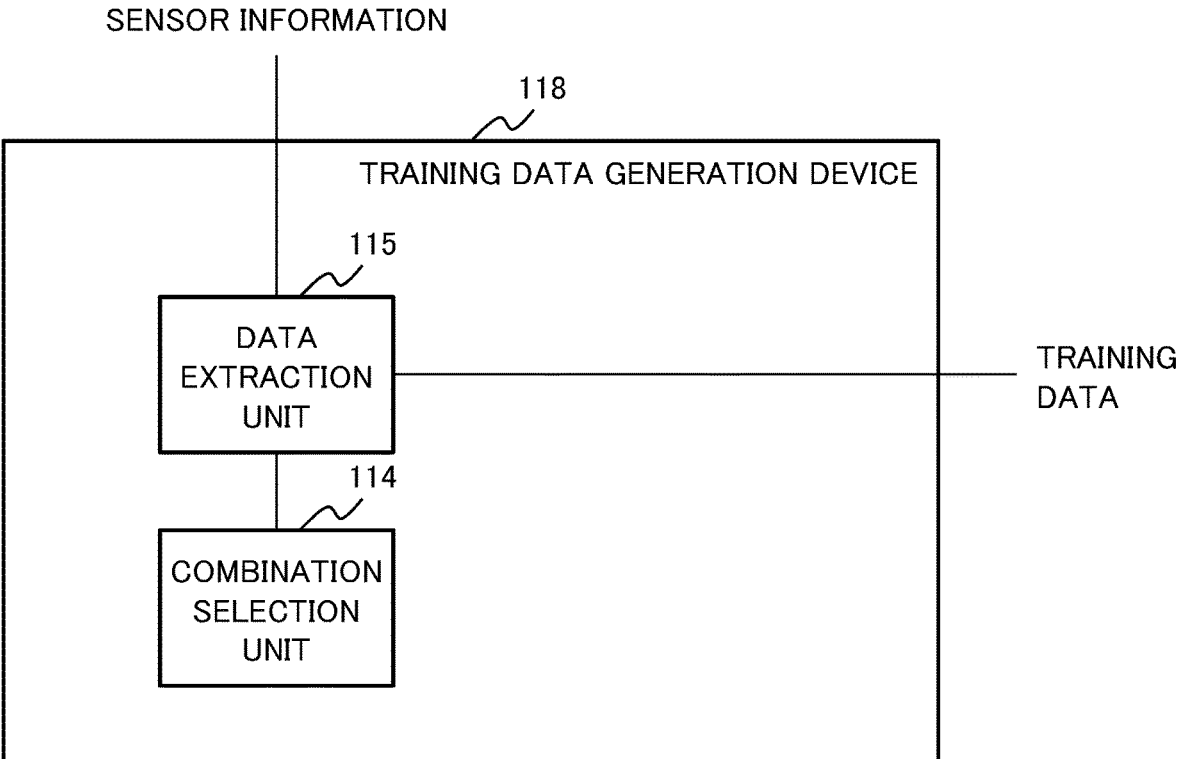
FIG. 10 is a block diagram illustrating an example of a configuration of a training data generation device according to a second example embodiment.

FIG. 10 is a block diagram illustrating an example of a configuration of a training data generation device 118 according to the second example embodiment.

The training data generation device 118 includes the combination selection unit 114 and the data extraction unit 115. The combination selection unit 114 selects, from items to be used for selection, a combination including at least two or more of the items. The items used for selection are items included in any of the state of the road, the type of the road, the type of the sensor information for determining the state, the acquisition condition of the sensor information, and the external environment in the acquisition of the sensor information. Then, the data extraction unit 115 extracts the sensor information using the combination as training data used for training a model for determining the state of the road using the sensor information.

As in the training data generation device 110, the training data generation device 118 configured as described above can obtain an effect of reducing the load of generating training data used for training the model used for determining the state of the road.

The training data generation device 118 has a minimum configuration of the training data generation device 110 of the first example embodiment.

The state determination device 100 may use a storage device (not illustrated) as the training data storage device 120 and the model storage device 140.

Alternatively, the training data generation device 110 or 118 may output the training data to the model generation device 130. Furthermore, the model generation device 130 may output the generated model to the sensor information determination device 150. In this case, the state determination device 100 may not include the training data storage device 120 and the model storage device 140.

Figure 11:
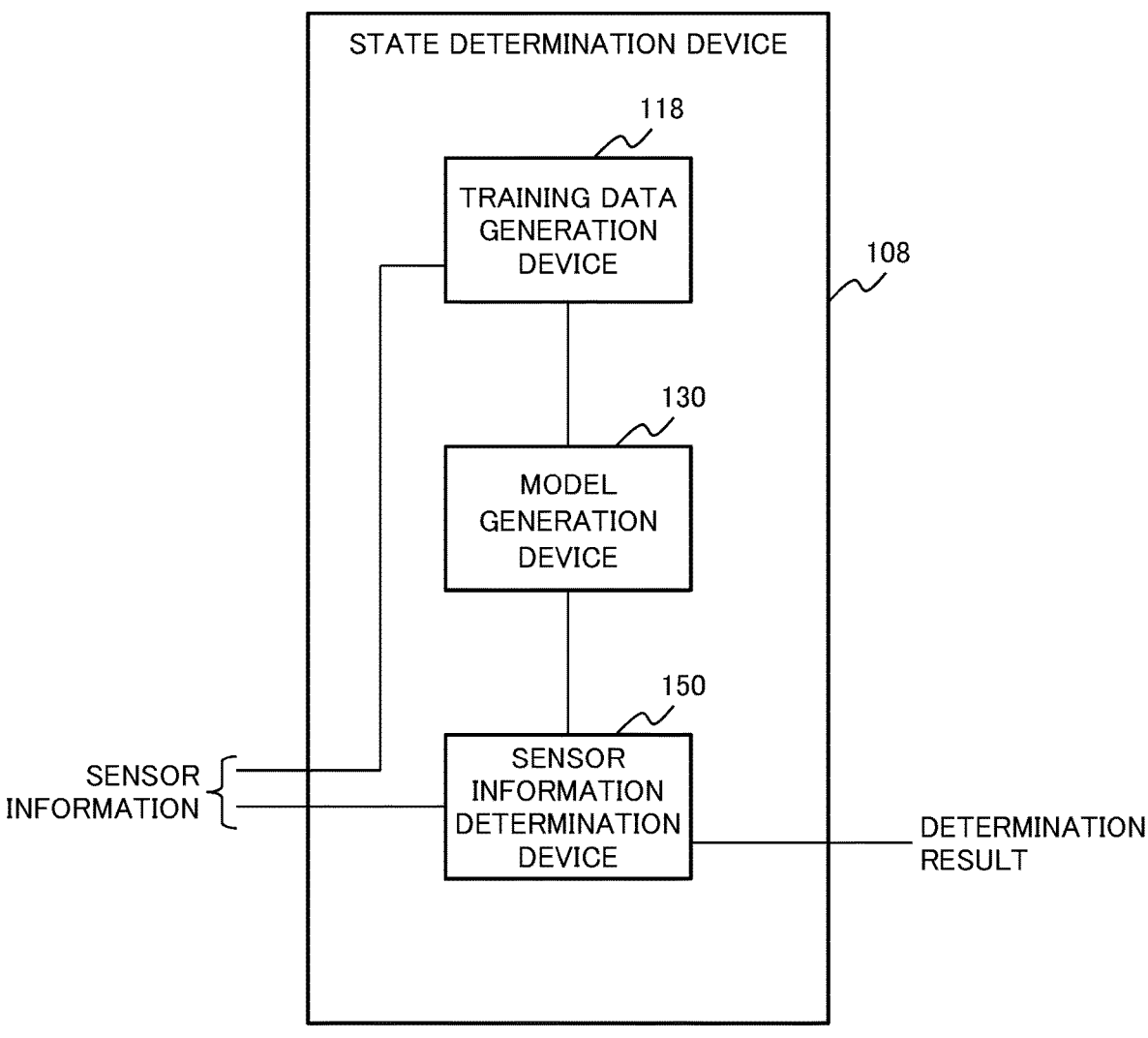
FIG. 11 is a block diagram illustrating an example of a configuration of a state determination device according to the second example embodiment.

FIG. 11 is a block diagram illustrating an example of a configuration of a state determination device 108 including the training data generation device 118 according to the second example embodiment.

The state determination device 108 includes the training data generation device 118, the model generation device 130, and the sensor information determination device 150. The training data generation device 118 operates as described above. The model generation device 130 executes machine leaning for predetermined models using a plurality of pieces of training data, and generates a plurality of trained models related to the respective training data. The sensor information determination device applies the sensor information to a plurality of trained models, acquires determination results of the plurality of trained models, and determines a state of a road related to the sensor information using the plurality of acquired determination results.

The state determination device 108 configured as described above can obtain an effect of reducing the load of generating training data used for training the model used for determining the state of the road as in the state determination device 100 of the first example embodiment.

The state determination device 108 has a minimum configuration of the state determination device 100 of the first example embodiment.

Figure 12:
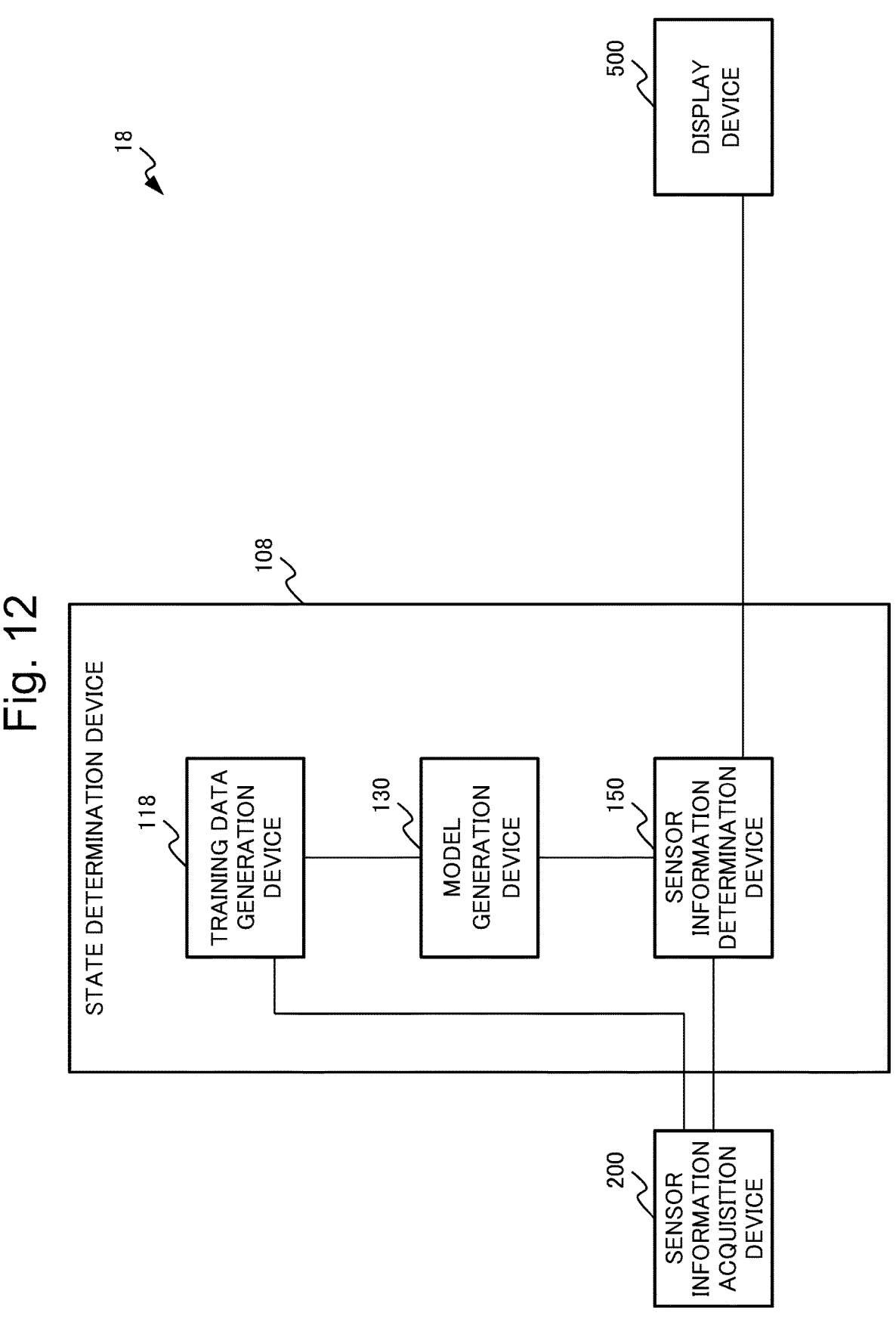
FIG. 12 is a block diagram illustrating an example of a configuration of a state determination system according to the second example embodiment.

FIG. 12 is a block diagram illustrating an example of a configuration of a state determination system 18 including the state determination device 108 according to the second example embodiment.

The state determination system 18 includes the state determination device 108, the sensor information acquisition device 200, and the display device 500. The state determination device 108 operates as described above. The sensor information acquisition device 200 outputs the sensor information to the state determination device. The display device 500 displays information output by the state determination device 108.

As in the state determination system 10 of the first example embodiment, the state determination system 18 configured as described above can obtain an effect of reducing the load of generating training data used for training a model used for determining a state of a road.

The state determination system 18 has a minimum configuration of the state determination system 10 of the first example embodiment.

Some or all of the above example embodiments may be described as the following Supplementary Notes, but are not limited to the following.
(Supplementary Note 1)

A training data generation device including:

a memory; and at least one processor coupled to the memory, the processor performing operations, the operations including:

selecting, from items included in any of a state of a road, a type of the road, a type of sensor information for determining the state of the road, an acquisition condition of the sensor information and an external environment in an acquisition of the sensor information, a combination including at least two or more of the items; and extracting, using the combination, the sensor information as training data to be used for training a model for determining the state of the road.
(Supplementary Note 2)

The training data generation device according to Supplementary Note 1, wherein the items selected in the combination include at least an acquisition time of the sensor information.
(Supplementary Note 3)

The training data generation device according to Supplementary Note 2, wherein the items selected in the combination include at least one of a structure around or in a vicinity of a road, a speed or acceleration of a moving object in which a sensor that acquires the sensor information is mounted, and a category of the road.
(Supplementary Note 4)

The training data generation device according to any one of Supplementary Notes 1 to 3, wherein the operations further include:

selecting the combination based on a predetermined instruction from a user.
(Supplementary Note 5)

The training data generation device according to any one of Supplementary Notes 1 to 4, wherein the operations further include:

outputting at least one of item selectable as the combination and item unselectable as the combination.
(Supplementary Note 6)

The training data generation device according to Supplementary Note 5, wherein the operations further include:

in a case where the item unselectable as the combination is output, outputting a reason why the item is unselectable.

(Supplementary Note 7)

The training data generation device according to Supplementary Note 5 or 6, wherein the operations further include:

outputting at least one of the number and a ratio of pieces of the sensor information related to the respective items included in the combination.

(Supplementary Note 8)

The training data generation device according to any one of Supplementary Notes 1 to 7, wherein the operations further include:

acquiring the sensor information; and storing the sensor information.

(Supplementary Note 9)

The training data generation device according to Supplementary Note 8, wherein the operations further include:

classifying the sensor information or the stored sensor information based on the items; and selecting the sensor information from the classified sensor information.

(Supplementary Note 10)

A state determination device including:

the training data generation device according to any one of Supplementary Notes 1 to 9;

a model generation device that executes machine learning for a predetermined model using a plurality of pieces of the training data and generates a plurality of trained models related to the plurality of respective pieces of training data; and a sensor information determination device that applies the sensor information to the plurality of trained models, acquires a plurality of determination results of the plurality of trained models, and determines the state of the road related to the sensor information using the plurality of acquired determination results.

(Supplementary Note 11)

The state determination device according to Supplementary Note 10, wherein the model generation device applies predetermined data to the plurality of trained models generated and calculates accuracy of each of the plurality of trained models.

(Supplementary Note 12)

A state determination system including:

the state determination device according to Supplementary Note 10 or 11;

a sensor information acquisition device that outputs the sensor information to the state determination device; and a display device that displays information output by the state determination device.

(Supplementary Note 13)

The state determination system according to Supplementary Note 12, further including:

an information providing device that outputs an external environment to the state determination device.

(Supplementary Note 14)

The state determination system according to Supplementary Note 12 or 13, further including:

an input device that outputs an instruction to the state determination device.

(Supplementary Note 15)

A training data generation method including:

selecting, from items included in any of a state of a road, a type of the road, a type of sensor information for determining the state of the road, an acquisition condition of the sensor information and an external environment in an acquisition of the sensor information, a combination including at least two or more of the items; and extracting, using the combination, the sensor information as training data to be used for training a model for determining the state of the road.

(Supplementary Note 16)

The training data generation method according to Supplementary Note 15, wherein the items selected in the combination include at least an acquisition time of the sensor information.

(Supplementary Note 17)

The training data generation method according to Supplementary Note 16, wherein the items selected in the combination include at least one of a structure around or in a vicinity of a road, a speed or acceleration of a moving object in which a sensor that acquires the sensor information is mounted, and a category of the road.

(Supplementary Note 18)

The training data generation method according to any one of Supplementary Notes 15 to 17, further including:

selecting the combination based on a predetermined instruction from a user.

(Supplementary Note 19)

The training data generation method according to any one of Supplementary Notes 15 to 18, further including:

extracting at least one of item selectable as the combination and item unselectable as the combination; and outputting at least one of the item selectable as the combination and the item unselectable as the combination.

(Supplementary Note 20)

The training data generation method according to Supplementary Note 19, further including:

generating a reason why the item is unselectable; and in a case where the item unselectable as the combination is output, outputting a reason why the item is unselectable.

(Supplementary Note 21)

The training data generation method according to Supplementary Note 19 or 20, further including:

generating at least one of the number and a ratio of pieces of the sensor information related to the respective items included in the combination; and outputting at least one of the number and the ratio of the pieces of sensor information.

(Supplementary Note 22)

The training data generation method according to any one of Supplementary Notes 15 to 21, further including:

acquiring the sensor information; and storing the sensor information.

(Supplementary Note 23)

The training data generation method according to Supplementary Note 22, further including:

classifying the acquired sensor information or the stored sensor information based on the items; and selecting the sensor information from the classified sensor information.

(Supplementary Note 24)

A state determination method including:

by a training data generation device, performing the training data generation method according to any one of Supplementary Notes 15 to 23;

by a model generation device, executing machine learning for a predetermined model using a plurality of pieces of the training data and generating a plurality of trained models related to the plurality of respective pieces of training data; and by a sensor information determination device, applying the sensor information to the plurality of trained models, acquiring a plurality of determination results of the plurality of trained models, and determining the state of the road related to the sensor information using the plurality of acquired determination results.

(Supplementary Note 25)

The state determination method according to Supplementary Note 24, wherein by the model generation device, applying predetermined data to the plurality of trained models generated and calculating accuracy of each of the plurality of trained models.

(Supplementary Note 26)

A state determination method including:

by a state determination device, performing the state determination method according to Supplementary Note 24 or 25;

by a sensor information acquisition device, outputting the sensor information to the state determination device; and by a display device, displaying information output by the state determination device.

(Supplementary Note 27)

The state determination method according to Supplementary Note 26, further including:

by an information providing device, outputting an external environment to the state determination device.

(Supplementary Note 28)

The state determination method according to Supplementary Note 26 or 27, further including:

by an input device, outputting an instruction to the state determination device.

(Supplementary Note 29)

A non-transitory computer-readable recording medium that embodies a program for causing a computer to perform a method, the method including:

selecting, from items included in any of a state of a road, a type of the road, a type of sensor information for determining the state of the road, an acquisition condition of the sensor information and an external environment in an acquisition of the sensor information, a combination including at least two or more of the items; and extracting, using the combination, the sensor information as training data to be used for training a model for determining the state of the road.

(Supplementary Note 30)

The recording medium according to Supplementary Note 29, wherein the items selected in the combination include at least an acquisition time of the sensor information.

(Supplementary Note 31)

The recording medium according to Supplementary Note 30, wherein the items selected in the combination include at least one of a structure around or in a vicinity of a road, a speed or acceleration of a moving object in which a sensor that acquires the sensor information is mounted, and a category of the road.

(Supplementary Note 32)

The recording medium according to any one of Supplementary Notes 29 to 31 recording a program for causing a computer to perform a method, the method including:

selecting the combination based on a predetermined instruction from a user.

(Supplementary Note 33)

The recording medium according to any one of Supplementary Notes 29 to 32 recording a program for causing a computer to perform a method, the method including:

extracting at least one of the item selectable as the combination and the item unselectable as the combination; and outputting at least one of the item selectable as the combination and the item unselectable as the combination.

(Supplementary Note 34)

The recording medium according to Supplementary Note 33 recording a program for causing a computer to perform a method, the method including:

generating a reason why the item is unselectable; and in a case where the item unselectable as the combination is output, outputting a reason why the item is unselectable.

(Supplementary Note 35)

The recording medium according to Supplementary Note 33 or 34 recording a program for causing a computer to perform a method, the method including:

generating at least one of the number and a ratio of pieces of the sensor information related to the respective items included in the combination; and outputting at least one of the number and the ratio of the pieces of sensor information.

(Supplementary Note 36)

The recording medium according to any one of Supplementary Notes 29 to 35 recording a program for causing a computer to perform a method, the method including:

acquiring the sensor information; and storing the sensor information.

(Supplementary Note 37)

The recording medium according to Supplementary Note 36 recording a program for causing a computer to perform a method, the method including:

classifying the acquired sensor information or the stored sensor information based on the items; and selecting the sensor information from the classified sensor information.

(Supplementary Note 38)

The recording medium according to any one of Supplementary Notes 29 to 37 recording a program for causing a computer to perform a method, the method including:

executing machine learning for a predetermined model using a plurality of the training data and generating a plurality of trained models related to the plurality of respective pieces of training data; and applying the sensor information to the plurality of trained models, acquiring a plurality of determination results of the plurality of trained models, and determining the state of the road related to the sensor information using the plurality of acquired determination results.

(Supplementary Note 39)

The recording medium according to Supplementary Note 38 recording a program for causing a computer to perform a method, the method including:

applying predetermined data to the plurality of trained models generated and calculating accuracy of each of the plurality of trained models.

Although the present invention is described above with reference to the example embodiments, the present invention is not limited to the above example embodiments. It will be understood by those of ordinary skill in the art that various changes in form and details may be made therein without departing from the spirit and scope of the present invention as defined by the claims.

REFERENCE SIGNS LIST 10 state determination system
18 state determination system
100 state determination device
108 state determination device
110 training data generation device
118 training data generation device
111 sensor information acquisition unit
112 sensor information classification unit
113 sensor information storage unit
114 combination selection unit
115 data extraction unit
120 training data storage device
130 model generation device
140 model storage device
150 sensor information determination device
200 sensor information acquisition device
300 information providing device
400 input device
500 display device
610 CPU
620 ROM
630 RAM
640 storage device
650 NIC
690 recording medium
810 server
820 drive recorder
830 data center
840 terminal device

What is claimed is:

1. A training data generation device comprising: a memory; and at least one processor coupled to the memory, the processor performing operations, the operations comprising: selecting, from items included in any of a state of a road, a type of the road, a type of sensor information for determining the state of the road, an acquisition condition of the sensor information and an external environment in an acquisition of the sensor information, a combination including at least two or more of the items; and extracting, using the combination, the sensor information as training data to be used for training a model for determining the state of the road, wherein the operations further comprise: extracting and outputting the item unselectable as the combination.

2. The training data generation device according to claim 1, wherein
the items selected in the combination include at least an acquisition time of the sensor information.

3. The training data generation device according to claim 2, wherein
the items selected in the combination include at least one of a structure around or in a vicinity of a road, a speed or acceleration of a moving object in which a sensor that acquires the sensor information is mounted, and a category of the road.

4. The training data generation device according to claim 1, wherein the operations further comprise:
selecting the combination based on a predetermined instruction from a user.

5. The training data generation device according to claim 1, wherein the operations further comprise:

in a case where the item unselectable as the combination is output, outputting a reason why the item is unselectable.

6. The training data generation device according to claim 1, wherein the operations further comprise:
outputting at least one of the number and a ratio of pieces of the sensor information related to the respective items included in the combination.

7. The training data generation device according to claim 1, wherein the operations further comprise:
acquiring the sensor information; and
storing the sensor information.

8. The training data generation device according to claim 7, wherein the operations further comprise:
classifying the sensor information the stored sensor information based on the items; and
extracting the sensor information from the classified sensor information.

9. A training data generation method comprising: selecting, from items included in any of a state of a road, a type of the road, a type of sensor information for determining the state of the road, an acquisition condition of the sensor information and an external environment in an acquisition of the sensor information, a combination including at least two or more of the items; extracting, using the combination, the sensor information as training data to be used for training a model for determining the state of the road; extracting at least one of the item selectable as the combination and the item unselectable as the combination; and outputting the item unselectable as the combination.

10. The training data generation method according to claim 9, wherein
the items selected in the combination include at least an acquisition time of the sensor information.

11. The training data generation method according to claim 10, wherein
the items selected in the combination include at least one of a structure around or in a vicinity of the road, a speed or acceleration of a moving object in which a sensor that acquires the sensor information is mounted, and a category of the road.

12. The training data generation method according to claim 9, further comprising:
selecting the combination based on a predetermined instruction from a user.

13. The training data generation method according to claim 9, further comprising:
generating a reason why the item is unselectable; and
in a case where the item unselectable as the combination is output, outputting a reason why the item is unselectable.

14. The training data generation method according to claim 9, further comprising:
generating at least one of the number and a ratio of pieces of the sensor information related to the respective items included in the combination; and
outputting at least one of the number and the ratio of the pieces of sensor information.

15. The training data generation method according to claim 9, further comprising:
acquiring the sensor information; and
storing the sensor information.

16. The training data generation method according to claim 15, further comprising:
classifying the acquired sensor information or the stored sensor information based on the items; and selecting the sensor information from the classified sensor information.

17. A non-transitory computer-readable recording medium that embodies a program for causing a computer to perform a method, the method comprising: selecting, from items included in any of a state of a road, a type of the road, a type of sensor information for determining the state of the road, an acquisition condition of the sensor information and an external environment in an acquisition of the sensor information, a combination including at least two or more of the items; extracting, using the combination, the sensor information as training data to be used for training a model for determining the state of the road; extracting at least one of the item selectable as the combination and the item unselectable as the combination; and outputting the item unselectable as the combination.

18. The recording medium according to claim 17, wherein the items selected in the combination include at least an acquisition time of the sensor information.

* * * * *